US011312847B2

(12) United States Patent
Doufas et al.

(10) Patent No.: US 11,312,847 B2
(45) Date of Patent: Apr. 26, 2022

(54) THERMOPLASTIC VULCANIZATE COMPOSITIONS

(71) Applicant: Celanese International Corporation, Irving, TX (US)

(72) Inventors: Antonios K. Doufas, Houston, TX (US); Krishnan Anantha Narayana Iyer, Pearland, TX (US); Eric P. Jourdain, Rhode Saint Genese (BE); Michael J. Goncy, Mont Belvieu, TX (US); Kelly Kirkendall, Deer Park, TX (US); Katya N. Reyna, Kemah, TX (US)

(73) Assignee: Celanese International Corporation, Irving, TX (US)

( * ) Notice: Subject to any disclaimer, the term of this patent is extended or adjusted under 35 U.S.C. 154(b) by 0 days.

(21) Appl. No.: 16/981,345

(22) PCT Filed: Mar. 29, 2019

(86) PCT No.: PCT/US2019/024745
§ 371 (c)(1),
(2) Date: Sep. 16, 2020

(87) PCT Pub. No.: WO2019/199486
PCT Pub. Date: Oct. 17, 2019

(65) Prior Publication Data
US 2021/0040300 A1 Feb. 11, 2021

Related U.S. Application Data

(60) Provisional application No. 62/655,573, filed on Apr. 10, 2018, provisional application No. 62/682,380, filed on Jun. 8, 2018.

(51) Int. Cl.
| C08L 23/16 | (2006.01) |
| C08L 23/30 | (2006.01) |
| C08L 23/36 | (2006.01) |
| C08L 23/32 | (2006.01) |

(52) U.S. Cl.
CPC ............... *C08L 23/16* (2013.01); *C08L 23/30* (2013.01); *C08L 23/32* (2013.01); *C08L 23/36* (2013.01); *C08L 2207/00* (2013.01); *C08L 2207/04* (2013.01); *C08L 2207/06* (2013.01)

(58) Field of Classification Search
None
See application file for complete search history.

(56) References Cited

U.S. PATENT DOCUMENTS

| 4,130,535 A | 12/1978 | Coron et al. |
| 6,268,438 B1 | 7/2001 | Ellul et al. |
| 6,407,174 B1 | 6/2002 | Ouhadi |
| 6,433,090 B1 | 8/2002 | Ellul et al. |
| 6,503,985 B1 | 1/2003 | Ellul et al. |
| 6,939,918 B2 | 9/2005 | Ellul et al. |
| 7,390,850 B2 | 6/2008 | Cook et al. |
| 7,504,458 B2 | 3/2009 | Abraham et al. |
| 7,851,556 B2 | 12/2010 | Abraham et al. |
| 8,338,543 B2 | 12/2012 | Moscardi et al. |
| 2004/0242779 A1 | 12/2004 | Cai et al. |
| 2006/0100347 A1 | 5/2006 | Ouhadi et al. |
| 2007/0021564 A1 | 1/2007 | Ellul et al. |
| 2007/0135571 A1 | 6/2007 | Ellul et al. |
| 2008/0033089 A1 | 2/2008 | Ellul et al. |
| 2008/0076879 A1 | 3/2008 | Resendes et al. |
| 2009/0270545 A1 | 10/2009 | Sahnoune et al. |
| 2011/0275764 A1 | 11/2011 | Ellul et al. |
| 2013/0209774 A1 | 8/2013 | Shirodkar et al. |
| 2014/0051808 A1 | 2/2014 | Tse |

FOREIGN PATENT DOCUMENTS

| EP | 0 889 090 A1 | 1/1999 |
| WO | 97/39059 A1 | 10/1997 |
| WO | 2017/077455 | 5/2017 |

OTHER PUBLICATIONS

P.S. Ravishankar M.D., "Recent advances in EPDM and dynamically vulcanized thermoplastic elastomers", Rubber World, (2015), vol. 252, pp. 1-4.
S. Bhattacharjeeh, "Tailoring polymer molecular structure in the EPDM slurry process", Rubber Chemistry and Technology, (2003), vol. 76, pp. 1057-1073.
P. S. Ravishankar, "Treatise on EPDM", (2012), vol. 85, pp. 327-349.

*Primary Examiner* — Richard A Huhn
(74) *Attorney, Agent, or Firm* — Dority & Manning, P.A.

(57) ABSTRACT

In an embodiment, a thermoplastic vulcanizate (TPV) composition is provided. The TPV composition includes a thermoplastic polyolefin; and an ethylene based copolymer rubber, wherein the ethylene based copolymer rubber has: a Mw of from 500,000 g/mol to 3,000,000 g/mol, a Mw/Mn of 4.0 or lower, and a $g'_{vis}$ of 0.90 or greater. In another embodiment, a TPV composition includes a thermoplastic phase and an ethylene-propylene-diene terpolymer, wherein the thermoplastic vulcanizate composition has: a hardness of from 20 Shore A to 60 Shore D; and a stress relaxation slope of −1 to −5 (1/min) as measured by an Elastocon stress relaxation instrument.

25 Claims, No Drawings

THERMOPLASTIC VULCANIZATE COMPOSITIONS

PRIORITY CLAIM

This application is a National Phase application claiming priority to PCT application Serial No. PCT/US2019/024745, filed Mar. 29, 2019, which claims priority to and the benefit of U.S. Ser. No. 62/655,573, filed Apr. 10, 2018, and U.S. Ser. No. 62/682,380 filed Jun. 8, 2018 and are incorporated by reference in their entirety.

FIELD

The present disclosure relates to thermoplastic vulcanizates having improved elastic properties.

BACKGROUND

Thermoplastic vulcanizates (TPVs) comprise finely-divided rubber particles dispersed within a thermoplastic matrix. These rubber particles are advantageously cross-linked to promote elasticity. The dispersed rubber phase is typically referred to as the discontinuous phase, and the thermoplastic phase is referred to as the continuous phase. Such TPVs are well known and may be prepared by dynamic vulcanization, which is a process whereby a rubber is cured or vulcanized using a curative agent within a blend with at least one thermoplastic polymer while the polymers are undergoing mixing or masticating at some elevated temperature, preferably above the melt temperature of the thermoplastic polymer. For example, U.S. Pat. No. 4,130,535 discloses a thermoplastic vulcanizates comprising blends of a polyolefin resin and completely cured olefin copolymer rubber. TPVs thus have the benefit of the elastomeric properties provided by the elastomer phase, with the processability of thermoplastics.

Automotive equipment manufacturers and suppliers are increasingly utilizing thermoplastic vulcanizates (TPVs) for automotive weather seals instead of EPDM or other thermoset compounds. Some reasons for the increased utilization of TPVs include advantages in processability and recyclability. Lips are a portion of the weather seal structure with highly demanding requirements for elasticity and resiliency. For example, the lip should immediately retract back to its original position upon deflection when touching the glass at temperatures up to about 90° C.

The olefin terpolymer rubber may include ethylene-propylene-diene (EPDM) rubber, which is generally formed by the polymerization of monomers, typically comprising two olefins, generally ethylene and propylene, and a lesser quantity of a non-conjugated diene monomer such as 5-ethylidene-2-norbornene (ENB), 5-vinyl-2-norbornene (VNB), 1,4-hexadiene, 1,6-octadiene, 5-methyl-1,4-hexadiene, and 3,7-dimethyl-1,6-octadiene. EPDM elastomers are generally polymers of very high molecular weight (as measured by their Mooney viscosity), and are often suitable for use in TPV applications. In TPV compositions having an EPDM polymer that is cured less than about 90 percent, compression set and elastic properties are generally unacceptably high for many applications, especially at elevated temperatures. In addition, the thermoplastic matrix tends to decrease resistance to compression set at lower temperatures. Some attempts have been made to improve this resistance to compression set. For example, various rubber processing oils have been added.

EPDM's containing ENB which is a non-conjugated diene having two polymerizable double bonds are well-known. Such terpolymers can be produced via conventional Zeigler-Natta polymerization using vanadium catalyst with solution polymerization. High molecular weight (MW) EPDMs produced via conventional solution polymerization contain significantly high amount of long chain branching (LCB). High levels of LCB can improve processability, but the effect on physical properties of the final EPDM product is not well understood. In the traditional solution process, ENB can be used to induce LCB in a post polymerization reaction via cationic crosslinking. On the other hand, slurry polymerization is well-known in the art for producing ultra-high MW polymers with relatively controlled MW distribution and long chain branching. The degree of LCB in EPDM can also be tailored in slurry polymerization by using carefully designed catalyst and process systems. In comparison, to solution polymerization that typically runs at a 5-10 wt % solids level, slurry process is known to improve the production rate of polymerization plants by allowing higher solids levels of 20-30 wt % without any limitation of solution viscosity. S. Bhattacharjee, H. Bender and D. Padliya, "Tailoring polymer molecular structure in the EPDM slurry process", Rubber Chemistry and Technology, Vol. 76, pp. 1057-1073 (2003).

TPVs produced by employing high MW EPDMs produced via solution polymerization typically exhibit inferior elastic properties relative to EPDM thermoset compounds due to the limitation of EPDM, namely high degree of LCB, and the existence of the plastic phase, typically polyolefin based thermoplastic. In addition to the elastic properties (low compression set, tension set, and high resiliency), the TPVs should maintain a balance of other mechanical properties including hardness, tensile properties (e.g., tensile strength, modulus, elongation to break) as well as extrusion performance including processability and part surface appearance (e.g., smoothness, no edge tear, no surface spots, no die lines, no Rococo). Current combinations of EPDMs and thermoplastic polyolefins employed have proved to be inadequate for this purpose.

There is a need to develop a TPV composition with superior balance of elastic properties in combination with mechanical properties as well excellent part surface appearance and extruder processability.

References for citing in an Information Disclosure Statement (37 CFR 1.97(h)) include: U.S. Patent No. 2008/0033089; U.S. Patent No. 2006/0100347; U.S. Patent No. 2011/0275764; U.S. Patent No. 2007/0135571; U.S. Pat. Nos. 6,939,918; 6,503,985; 6,433,090; 6,268,438; 7,851,556; 7,504,458; 8,338,543; 6,407,174; 7,390,850; U.S. Patent Publication No. 2008/0076879; U.S. Patent Publication No. 2007/0021564; U.S. Patent Publication No. 2004/0242779; U.S. Patent Publication No. 2009/0270545; EP889090; EP892831; P. S. Ravishankar, M. D. Ellul and G. J. Wouters, "Recent advances in EPDM and dynamically vulcanized thermoplastic elastomers", RUBBER WORLD, Vol. 252, pp. 1-4 (2015); S. Bhattacharjee, H. Bender and D. Padliya, "Tailoring polymer molecular structure in the EPDM slurry process", Rubber Chemistry and Technology, Vol. 76, pp. 1057-1073 (2003); P. S. Ravishankar, "Treatise on EPDM", Vol. 85, pp. 327-349 (2012).

SUMMARY

In an embodiment, a thermoplastic vulcanizate composition is provided. The thermoplastic vulcanizate composition includes a thermoplastic polyolefin; and an ethylene based copolymer rubber, wherein the ethylene based copolymer rubber has: a Mw of from 500,000 g/mol to 3,000,000 g/mol, a Mw/Mn of 4.0 or lower, a $g'_{vis}$ of 0.90 or greater, and a $\Delta\delta$ of from 30 to 80 degrees from small amplitude oscillatory shear (SAOS) where $\Delta\delta=\delta$ (0.1 rad/s)−$\delta$(128 rad/s), or a large amplitude oscillatory shear (LAOS) branching index of less than 3.

In another embodiment, a thermoplastic vulcanizate composition is provided. The thermoplastic vulcanizate composition includes a thermoplastic polyolefin; and an ethylene based copolymer rubber, wherein the ethylene based copolymer rubber has: a Mw of from 500,000 g/mol to 3,000,000 g/mol, a Mw/Mn of 4.0 or lower, and a $g'_{vis}$ of 0.90 or greater, wherein the thermoplastic olefin is a polypropylene and the ethylene based copolymer rubber is an ethylene-propylene-diene terpolymer.

In another embodiment, a thermoplastic vulcanizate composition is provided. The thermoplastic vulcanizate composition includes a thermoplastic phase and an ethylene-propylene-diene terpolymer, wherein the thermoplastic vulcanizate composition has: a hardness of from 20 Shore A to 60 Shore D; and a stress relaxation slope of −1 to −5 (1/min) as measured by an Elastocon stress relaxation instrument.

In another embodiment, a thermoplastic vulcanizate composition is provided. The thermoplastic vulcanizate composition includes a thermoplastic phase; and an ethylene-terpolymer, wherein the ethylene-propylene-diene terpolymer has: a Mw of from 500,000 g/mol to 3,000,000 g/mol; a Mw/Mn of from 2 to 4; a $g'_{vis}$ of from 0.90 to 1; and a $\Delta\delta$ of from 30 to 50 degrees from small amplitude oscillatory shear (SAOS).

In another embodiment, a thermoplastic vulcanizate composition is provided. The thermoplastic vulcanizate composition includes a thermoplastic phase; and an ethylene-propylene-diene terpolymer, wherein the ethylene-propylene-diene terpolymer has: a Mw of from 500,000 g/mol to 3,000,000 g/mol; a Mw/Mn of from 2 to 4; a $g'_{vis}$ of from 0.90 to 1; and a large amplitude oscillatory shear branching index (LAOS) of less than 3.

In another embodiment, an extruded tape is provided. The extruded tape includes any thermoplastic vulcanizate composition described herein, wherein the thermoplastic vulcanizate composition has a surface roughness of from 30 µin to 150 µin.

In another embodiment, a method of forming an article is provided. The method includes extruding, injection molding, blow molding, compression molding, or thermoforming any thermoplastic vulcanizate composition described herein; and forming the article.

In another embodiment, an article is provided. The article includes any thermoplastic vulcanizate composition described herein.

In another embodiment, a method of making any thermoplastic vulcanizate composition described herein is provided. The method includes: introducing an elastomer to an extrusion reactor; introducing a thermoplastic resin to the extrusion reactor; introducing a filler, an additive, or a combination of filler and additive to the extrusion reactor; introducing a first amount of process oil to the extrusion reactor at a first oil injection location; introducing a curative to the extrusion reactor a location that is downstream of the first or second oil injection location (if second amount of oil injection is applicable); introducing a second amount of process oil to the extrusion reactor at a second oil injection location, where the second oil injection location is downstream of the location where the curative is introduced to the extrusion reactor; and dynamically vulcanizing the elastomer with the curative is in the presence of the thermoplastic resin to form the thermoplastic vulcanizate composition, wherein the thermoplastic vulcanizate composition comprises a rubber phase that is dispersed and at least partially cross linked within a continuous thermoplastic matrix.

DETAILED DESCRIPTION

The present disclosure relates to thermoplastic vulcanizate compositions that include an ethylene-based elastomer (such as ethylene-propylene-diene terpolymer) and a polyolefin (such as a polypropylene). Herein, this disclosure provides for improved thermoplastic vulcanizate compositions with excellent elastic recovery and fabricability/processability to be particularly suitable for shaped articles, and as shaped components as part of composite structures. In an embodiment, the thermoplastic vulcanizate composition is provided having a dispersed, cross-linked rubber phase in a continuous thermoplastic polyolefin matrix phase comprising: a) at least one ethylene-propylene-diene terpolymer characterized by having a weight average molecular weight from about 500,000 g/mol to 3,000,000 g/mol, a molecular weight distribution from 2 to 4, a $g'_{vis}$ of 0.90 to 1, and a $\Delta\delta$ of 30 to 80 degrees from small amplitude oscillatory shear, or a large amplitude oscillatory shear branching index of less than 3; b) the ethylene-propylene-diene terpolymer of (a) oil-extended by 50 phr to 100 phr processing oil, where "phr" means parts per hundred parts rubber; c) a thermoplastic phase preferably comprising one polypropylene homopolymer having a weight average molecular weight greater than 300,000 g/mol, and a $g'_{vis}$ from about 0.2 to 1, and a melt flow rate from about 0.3 to about 30 dg/min, melt temperature greater than 120° C. This and other TPV compositions are described herein.

In another aspect of the present invention, a process for forming a thermoplastic vulcanizate comprises the steps of dynamically vulcanizing the above rubber with a curing agent while melt blending the above components under shear conditions.

These thermoplastic vulcanizate compositions advantageously demonstrate many of the properties of thermoset elastomers while retaining the processability advantages of thermoplastics materials. For example, the thermoplastic vulcanizate compositions exhibit superior elastic properties (low tension and compression sets, high stress relaxation) at similar or higher hardness and tensile properties (tensile strength, modulus, and elongation to break) when compared to similar TPVs produced using high MW EPDMs obtained via solution polymerization with a $g'_{vis}$ less than 0.9, M less than 30 degrees, and a LAOS branching index greater than 3. Moreover, the thermoplastic vulcanizate compositions have superior surface appearance and extrusion characteristics.

In some embodiments, the thermoplastic vulcanizates of the present disclosure can include a dynamically-cured rubber, a thermoplastic component or phase that includes (i) a long-chain branched polyolefin, and/or (ii) a thermoplastic resin that is a non-long-chain branched polyolefin. Other ingredients can include processing additives, oils, fillers, colorants and other ingredients that are conventionally included in thermoplastic vulcanizates.

In some embodiments, thermoplastic vulcanizates of the present disclosure include a rubber phase such as an ethylene-propylene based rubber and a thermoplastic matrix or phase (such as a propylene-based thermoplastic polymer, ethylene based thermoplastic polymer, or a butene-1-based thermoplastic polymer). The thermoplastic vulcanizates of some embodiments may also include other constituents that may be employed in the art of making thermoplastic vulcanizates. For example, the thermoplastic phase may include ethylene-based polymers such as polyethylene or a propylene-based polymer such as polypropylene or a mixture thereof.

In some embodiments, the thermoplastic vulcanizate composition includes a polypropylene; and an ethylene-propylene-diene terpolymer having: a Mw of from 500,000 g/mol to 3,000,000 g/mol, a molecular weight distribution from 2 to 4, a $g'_{vis}$ of 0.90 to 1, M of 30 to 50 degrees from small amplitude oscillatory shear, and a large amplitude oscillatory shear branching index of less than 3.

The present disclosure also provides a method for the fabrication of shaped articles and parts made by using standard thermoplastic elastomer processing techniques like extrusion, calendaring, and molding (e.g., injection or compression or blow molding). Such articles include seals (such as used in building construction, appliances, and/or automotive), roofing, tubing, hoses, strips, joints, isolators, wire and cable jackets and insulators, medical device components medical device components (including Syringe parts and catheters), packaging, trays, toys, sporting equipment, furniture, kitchen devices, handles, belts (including power transmission and conveyor belts) and appliance components. Also included are articles for transportation vehicles such as cars, trucks, trains, airplanes, and boats, including weather seals, noise and/or vibration insulation seals and mounts, disks, diaphragms, cups, joints, tubing, hoses, gaskets, O-rings, belts (including synchronous, asynchronous, serpentine, and V belts), wiper blades, mudflaps, skins, mats, boots, bellows, and trim.

For purposes of this disclosure, and unless otherwise indicated, a "composition" includes components of the composition and/or reaction products of two or more components of the composition.

Rubber Phase

The rubbers that may be employed to form the rubber phase include those polymers that are capable of being cured or crosslinked by a phenolic resin or a hydrosilylation curative (e.g., silane-containing curative), a peroxide with a coagent, a moisture cure via silane grafting, or an azide. Reference to a rubber may include mixtures of more than one rubber. Non-limiting examples of rubbers include olefinic elastomeric terpolymers, and mixtures thereof. In some embodiments, olefinic elastomeric terpolymers include ethylene-based elastomers such as ethylene-propylene-non-conjugated diene rubbers.

Ethylene-Propylene Rubber

The term ethylene-propylene rubber refers to rubbery terpolymers polymerized from ethylene, at least one other α-olefin monomer, and at least one diene monomer (for example. an ethylene-propylene-diene terpolymer or an EPDM terpolymer). The α-olefins may include propylene, 1-butene, 1-hexene, 4-methyl-1-pentene, 1-octene, 1-decene, or combinations thereof. In one embodiment, the α-olefins include propylene, 1-hexene, 1-octene or combinations thereof. The diene monomers may include 5-ethylidene-2-norbornene; 5-vinyl-2-norbornene; divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. Polymers prepared from ethylene, α-olefin, and diene monomers may be referred to as a terpolymer or even a tetrapolymer in the event that multiple α-olefins or dienes are used.

In some embodiments, where the diene includes 5-ethylidene-2-norbornene (ENB) or 5-vinyl-2-norbornene (VNB), the ethylene-propylene rubber may include at least about 1 wt % (such as at least about 3 wt %, such as at least about 4 wt %, such as at least about 5 wt %) based on the total weight of the ethylene-propylene rubber. In other embodiments, where the diene includes ENB or VNB, the ethylene-propylene rubber may include from about 1 wt % to about 15 wt % (such as from about 3 wt % to about 15 wt %, such as from about 5 wt % to about 12 wt %, such as from about 7 wt % to about 11 wt %) from 5-ethylidene-2-norbornene based on the total weight of the ethylene-propylene rubber.

In some embodiments, the ethylene-propylene rubber includes one or more of the following characteristics:

1) An ethylene-derived content that is from about 10 wt % to about 99.9 wt %, (such as from about 10 wt % to about 90 wt %, such as from 12 wt % to about 90 wt %, such as from about 15 wt % to about 90 wt % such as from about 20 wt % to about 80 wt %, such as from about 40 wt % to about 70 wt %, such as from about 50 wt % to about 70 wt %, such as from about 55 wt % to about 65 wt %, such as from about 60 wt % and about 65 wt %) based on the total weight of the ethylene-propylene rubber. In some embodiments, the ethylene-derived content is from about 40 wt % to about 85 wt %, such as from about 40 wt % to about 85 wt %, based on the total weight of the composition.

2) A diene-derived content that is from about 0.1 to about to about 15 wt %, such as from about 0.1 wt % to about 5 wt %, such as from about 0.2 wt % to about 10 wt %, such as from about 2 wt % to about 8 wt %, or from about 4 wt % to about 12 wt %, such as from about 4 wt % to about 9 wt %) based on the total weight of the ethylene-propylene rubber. In some embodiments, the diene-derived content is from about 3 wt % to about 15 wt % based on the total weight of the composition.

3) The balance of the ethylene-propylene rubber including α-olefin-derived content (e.g., $C_2$ to $C_{40}$, such as $C_3$ to $C_{20}$, such as $C_3$ to $C_{10}$ olefins, such as propylene).

4) A weight average molecular weight (Mw) that is about 100,000 g/mol or more (such as about 200,000 g/mol or more, such as about 400,000 g/mol or more, such as about 600,000 g/mol or more). In these or other embodiments, the Mw is about 1,200,000 g/mol or less (such as about 1,000,000 g/mol or less, such as about 900,000 g/mol or less, such as about 800,000 g/mol or less). In these or other embodiments, the Mw can be between about 500,000 g/mol and about 3,000,000 g/mol (such as between about 500,000 g/mol and about 2,000,000, such as between about 500,000 g/mol and about 1,500,000 g/mol, such as between about 600,000 g/mol and about 1,200,000 g/mol, such as between about 600,000 g/mol and about 1,000,000 g/mol).

5) A number average molecular weight (Mn) that is about 20,000 g/mol or more (such as about 60,000 g/mol or more, such as about 100,000 g/mol or more, such as about 150,000 g/mol or more). In these or other embodiments, the Mn is less than about 500,000 g/mol (such as about 400,000 g/mol or less, such as about 300,000 g/mol or less, such as about 250,000 g/mol or less).

6) A Z-average molecular weight (Mz) that is between about 10,000 g/mol and about 7,000,000 g/mol (such as between about 50,000 g/mol and about 3,000,000 g/mol, such as between about 70,000 g/mol and about 2,000,000 g/mol, such as between about 75,000 g/mol and about 1,500,000 g/mol, such as between about 80,000 g/mol and about 700,000 g/mol, such as between about 100,000 g/mol and about 500,000 g/mol).

7) A polydispersity index (Mw/Mn; PDI) that is between about 1 and about 10 (such as between about 1 and about 5, such as between about 1 and about 4, such as between about 2 and about 4 or between about 1 and about 3, such as between about 1.8 and about 3 or between about 1 and about 2, or between about 1 and 2.5).

8) A dry Mooney viscosity ($ML_{(1+4)}$ at 125° C.) per ASTM D-1646, that is from about 10 MU to about 500 MU or from about 50 MU to about 450 MU. In these or other embodiments, the Mooney viscosity is 250 MU or more, such as 350 MU or more.

9) A $g'_{vis}$ that is 0.8 or more (such as 0.85 or more, such as 0.9 or more, such as 0.95 or more, for example about 0.96, about 0.97, about 0.98, about 0.99, or about 1).

10) An LCB index (at 125° C.), that is about 5.0 or less (such as about 4.0 or less, such as about 3.0 or less, such as about 2.5 or less, such as about 2.0 or less, such as about 1.5 or less), where LCB index is defined based on large amplitude oscillatory shear measurements using a strain of 1000%, and frequency of 0.6 rad/s.

11) A $\Delta\delta$ that is about 10° or more (such as about 20° or more, such as greater than about 30° or more, such as about 32° or more, such as about 35° or more), where $\Delta\delta=\delta(0.1$ rad/s, 125° C.)$-\delta(128$ rad/s, 125° C.).

12) A glass transition temperature ($T_g$), as determined by Differential Scanning calorimetry (DSC) according to ASTM E 1356, that is about −20° C. or less (such as about −30° C. or less, such as about −50° C. or less). In some embodiments, $T_g$ is between about −20° C. and about −60° C.

13) A large amplitude oscillatory shear (LAOS) branching index of less than 3.

14) A $\Delta\delta$ of from about 30 degrees to about 80 degrees (such as about 30 degrees to about 50 degrees) from small amplitude oscillatory shear (SAOS).

The ethylene-propylene rubber may be manufactured or synthesized by using a variety of techniques. For example, these terpolymers can be synthesized by employing solution, slurry, or gas phase polymerization techniques of combination thereof that employ various catalyst systems including Ziegler-Natta systems including vanadium catalysts and take place in various phases such as solution, slurry, or gas phase. Exemplary catalysts include single-site catalysts including constrained geometry catalysts involving Group IV-VI metallocenes. In some embodiments, the EPDMs can be produced via a conventional Ziegler-Natta catalysts using a slurry process, especially those including Vanadium compounds, as disclosed in U.S. Pat. No. 5,783,645, as well as metallocene catalysts, which are also disclosed in U.S. Pat. No. 5,756,416. Other catalysts systems such as the Brookhart catalyst system may also be employed. Optionally, such EPDMs can be prepared using the above catalyst systems in a solution process.

Elastomeric terpolymers are commercially available under the tradenames Vistalon™ (ExxonMobil Chemical Co.; Houston, Tex.), Keltan™ (Arlanxeo Performance Elastomers; Orange, Tex.), Nordel™ IP (Dow), NORDEL MG™ (Dow), Royalene™ (Lion Elastomers), and Suprene™ (SK Global Chemical). Specific examples include Vistalon 3666, Keltan 5469 Q, Keltan 4969 Q, Keltan 5469 C, and Keltan 4869 C, Royalene 694, Royalene 677, Suprene 512F, Nordel 6555.

Table 1 shows the characteristics of selected elastomeric terpolymers.

TABLE 1

Characteristics of Rubbers Used in Selected TPV Compositions

| Grade | % C2 | % ENB | Oil (phr) | Mw (g/mol) | Mz (g/mol) | Mw/Mn | LCB-$g'_{vis}$ | BI (LAOS) | $\Delta\delta$ (SAOS) |
|---|---|---|---|---|---|---|---|---|---|
| Vistalon 3666 | 64 | 4.2 | 75 | 460,000 | 509,000 | 4.0 | 0.867 | 3.8 | 26.5 |
| Nordel 6555 | 53 | 8.5 | 24 | 226,000 | 640,000 | 3.3 | 0.920 | 3.1 | 24.7 |
| Suprene 512F | 69 | 4.5 | 0 | 255,000 | 980,000 | 4.7 | 0.823 | 6.3 | 17.6 |
| Royalene 694 | 67 | 4.5 | 75 | 495,000 | 1,550,000 | 3.8 | 0.828 | 6.0 | 18.2 |
| Royalene 677 | 70 | 4.5 | 100 | 521,000 | 1,100,000 | 2.8 | 0.928 | 1.4 | 33.9 |
| Keltan 4869C | 68 | 8.7 | 100 | 542,000 | 1,200,000 | 2.7 | 0.984 | 0.8 | 32.0 |
| Keltan 5469C | 61 | 4.5 | 100 | 573,000 | 1,223,000 | 2.8 | 0.956 | 0.8 | 32.9 |
| Keltan 5469Q | 61 | 4 | 100 | 600,000 | 1,064,000 | 2.5 | 1.000 | −0.5 | 39.3 |
| Keltan 4969Q | 69 | 9.8 | 100 | 507,000 | 931,000 | 2.6 | 0.977 | 0.5 | 36.1 |

LCB-$g'_{vis}$ was measured using GPC-4D.
BI (LAOS) was Measured using APA rheometer at 125° C.
$\Delta\delta$ = Measured using APA rheometer at 125 C., defined as $\delta$ (@ 0.1 1/s) − $\delta$(@ 128 1/s).

Techniques for determining the molecular properties are described below.

In some embodiments, the ethylene-based elastomer may be obtained in an oil extended form, with about a 50 phr to about 200 phr process oil, such as about 75 phr to about 120 phr process oil on the basis of 100 phr of elastomer.

Thermoplastic Phase

In some embodiments, the thermoplastic phase includes a polymer that can flow above its melting temperature. In some embodiments, the major component of the thermoplastic phase includes a polypropylene (such as a homopolymer, random copolymer, or impact copolymer, or combination thereof), or a polyethylene. In some embodiments, the thermoplastic phase may also include, as a minor constituent, an ethylene-based polymer (e.g., polyethylene) or a propylene-based polymer (e.g., polypropylene).

Propylene-Based Polymer

Propylene-based polymers include those solid, generally high-molecular weight plastic resins that primarily comprise units deriving from the polymerization of propylene. In some embodiments, at least 75%, in other embodiments at least 90%, in other embodiments at least 95%, and in other embodiments at least 97% of the units of the propylene-based polymer derive from the polymerization of propylene. In particular embodiments, these polymers include homopolymers of propylene. Homopolymer polypropylene can comprise linear chains and/or chains with long chain branching.

In some embodiments, the propylene-based polymers may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof. Specifically included are the reactor, impact, and random copolymers of propylene with ethylene or the higher α-olefins, described above, or with $C_{10}$-$C_{20}$ olefins.

In some embodiments, the propylene-based polymer includes one or more of the following characteristics:

1) The propylene-based polymers may include semi-crystalline polymers. In some embodiments, these polymers may be characterized by a crystallinity of at least 25 wt % or more (such as about 55 wt % or more, such as about 65 wt % or more, such as about 70 wt % or more). Crystallinity may be determined by dividing the heat of fusion (Hf) of a sample by the heat of fusion of a 100% crystalline polymer, which is assumed to be 209 joules/gram for polypropylene.

2) A Hf that is about 52.3 J/g or more (such as about 100 J/g or more, such as about 125 J/g or more, such as about 140 J/g or more).

3) A weight average molecular weight (Mw) that is between about 50,000 g/mol and about 2,000,000 g/mol (such as between about 100,000 g/mol and about 1,000,000 g/mol, such as between about 100,000 g/mol and about 600,000 g/mol or between about 400,000 g/mol and about 800,000 g/mol) as measured by GPC with polystyrene standards.

4) A number average molecular weight (Mn) that is between about 25,000 g/mol and about 1,000,000 g/mol (such as between about 50,000 g/mol and about 300,000 g/mol) as measured by GPC with polystyrene standards.

5) A $g'_{vis}$ that is 1 or less (such as 0.9 or less, such as 0.8 or less, such as 0.6 or less, such as 0.5 or less).

6) A melt mass flow rate (MFR) (ASTM D1238, 2.16 kg weight @ 230° C.) that is about 0.1 g/10 min or more (such as about 0.2 g/10 min or more, such as about 0.2 g/10 min or more). Alternately, the MFR is between about 0.1 g/10 min and about 50 g/10 min, such as between about 0.5 g/10 min and about 5 g/10 min, such as between about 0.5 g/10 min and about 3 g/10 min.

7) A melt temperature ($T_m$) that is from about 110° C. to about 170° C. (such as from about 140° C. to about 168° C., such as from about 160° C. to about 165° C.).

8) A glass transition temperature ($T_g$) that is from about −50° C. to about 10° C. (such as from about −30° C. to about 5° C., such as from about −20° C. to about 2° C.).

9) A crystallization temperature ($T_a$) that is about 75° C. or more (such as about 95° C. or more, such as about 100° C. or more, such as about 105° C. or more, such as between about 105° C. and about 130° C.).

In some embodiments, the propylene-based polymers include a homopolymer of a high-crystallinity isotactic or syndiotactic polypropylene. This polypropylene can have a density of from about 0.89 to about 0.91 g/ml, with the largely isotactic polypropylene having a density of from about 0.90 to about 0.91 g/ml. Also, high and ultra-high molecular weight polypropylene that has a fractional melt flow rate can be employed. In some embodiments, polypropylene resins may be characterized by a MFR (ASTM D-1238; 2.16 kg @ 230° C.) that is about 10 dg/min or less (such as about 1.0 dg/min or less, such as about 0.5 dg/min or less).

In some embodiments, the polypropylene includes a homopolymer, random copolymer, or impact copolymer polypropylene or combination thereof. In some embodiments, the polypropylene is a high melt strength (HMS) long chain branched (LCB) homopolymer polypropylene.

The propylene-based polymers may be synthesized by using an appropriate polymerization technique known in the art such as the conventional Ziegler-Natta type polymerizations, and catalysis employing single-site organometallic catalysts including metallocene catalysts.

Examples of polypropylene useful for the thermoplastic vulcanizate compositions described herein include ExxonMobil™ PP5341 (available from ExxonMobil); Achieve™ PP6282NE1 (available from ExxonMobil) and/or polypropylene resins with broad molecular weight distribution as described in U.S. Pat. Nos. 9,453,093 and 9,464,178; and other polypropylene resins described in US 20180016414 and US 20180051160 (for example, PDH025, as shown in the Table below); Waymax MFX6 (available from Japan Polypropylene Corp.); Borealis Daploy™ WB140 (available from Borealis AG); and Braskem Ampleo 1025MA and Braskem Ampleo 1020GA (available from Braskem Ampleo). Table 2 shows the characteristics of selected propylene based polymers.

TABLE 2

Molecular Properties of Selected Polypropylenes

| Grade | Mw (g/mol) | Mw/Mn | LCB-$g'_{vis}$ |
|---|---|---|---|
| ExxonMobil PP5341 | 562,000 | 7.5 | 1.000 |
| ExxonMobil Achieve ™ PP6282NE1 | 389,000 | 5.3 | 0.900 |
| ExxonMobil PDH025 | 540,000 | 16 | 0.857 |
| Waymax MFX6 | 390,000 | 5.3 | 0.900 |
| Borealis Daploy WB140 | 671,000 | 7.6 | 0.526 |
| Braskem Ampleo 1025MA | 465,000 | 10.8 | 0.737 |

LCB-$g'_{vis}$ was measured using GPC-4D.

Ethylene-Based Polymer

Ethylene-based polymers include those solid, generally high-molecular weight plastic resins that primarily comprise units deriving from the polymerization of ethylene. In some embodiments, at least 90%, in other embodiments at least 95%, and in other embodiments at least 99% of the units of the ethylene-based polymer derive from the polymerization of ethylene. In particular embodiments, these polymers include homopolymers of ethylene.

In some embodiments, the ethylene-based polymers may also include units deriving from the polymerization of α-olefins such as propylene, 1-butene, 1-hexene, 1-octene, 2-methyl-1-propene, 3-methyl-1-pentene, 4-methyl-1-pentene, 5-methyl-1-hexene, and mixtures thereof.

In some embodiments, the ethylene-based polymer includes one or more of the following characteristics:

1) A melt index (MI) (ASTM D-1238, 2.16 kg@ 190° C.) that is from about 0.1 dg/min to about 1,000 dg/min (such as from about 1.0 dg/min to about 200 dg/min, such as from about 7.0 dg/min to about 20.0 dg/min).

2) A melt temperature ($T_m$) that is from about 140° C. to about 90° C. (such as from about 135° C. to about 125° C., such as from about 130° C. to about 120° C.).

The ethylene-based polymers may be synthesized by using an appropriate polymerization technique known in the art such as the conventional Ziegler-Natta type polymerizations, and catalysis employing single-site organometallic catalysts including metallocene catalysts. Ethylene-based polymers are commercially available. For example, polyethylene is commercially available under the tradename ExxonMobil™ Polyethylene (ExxonMobil). Ethylene-based copolymers are commercially available under the tradename ExxonMobil™ Polyethylene (ExxonMobil), which include metallocene produced linear low density polyethylene including Exceed™, Enable™, and Exceed™ XP.

In some embodiments, the polyethylene includes a low density, linear low density, or high density polyethylene. In some embodiments, the polyethylene can be a high melt strength (HMS) long chain branched (LCB) homopolymer polyethylene.

Butene-1-Based Polymer

Butene-1-based polymers include those solid, generally high-molecular weight isotactic butene-1 resins that primarily comprise units deriving from the polymerization of butene-1.

In some embodiments, the butene-1-based polymers include isotactic poly(butene-1) homopolymers. In some embodiments, they include copolymers copolymerized with comonomer such as ethylene, propylene, 1-butene, 1-hexane, 1-octene, 4-methyl-1-pentene, 2-methyl-1-propene, 3-methyl-1-pentene, 4-methyl-1-pentene, 5-methyl-hexene, and mixtures of two or more thereof.

In some embodiments, the butene-1-based polymer includes one or more of the following characteristics:
1) At least 90 wt % or more of the units of the butene-1-based polymer derive from the polymerization of butene-1 (such as about 95 wt % or more, such as about 98 wt % or more, such as about 99 wt % or more). In some embodiments, these polymers include homopolymers of butene-1.
2) A melt index (MI) (ASTM D-1238, 2.16 kg @ 190° C.) that is about 0.1 dg/min to about 800 dg/min (such as from about 0.3 dg/min to about 200 dg/min, such as from about 0.3 dg/min to about 4.0 dg/min). In these or other embodiments, a MI of about 500 dg/min or less (such as about 100 dg/min or less, such as about 10 dg/min or less, such as about 5 dg/min or less).
3) A melt temperature ($T_m$) that is from about 130° C. to about 110° C. (such as from about 125° C. to about 115° C., such as from about 125° C. to about 120° C.).
4) A density, as determined according to ASTM D 792, that is from about 0.897 g/ml to about 0.920 g/ml, such as from about 0.910 g/ml to about 0.920 g/ml. In these or other embodiments, a density that is about 0.910 g/ml or more, such as 0.915 g/ml or more, such as about 0.917 g/ml or more.

The butene-1-based polymers may be synthesized by using an appropriate polymerization technique known in the art such as the conventional Ziegler-Natta type polymerizations, and catalysis employing single-site organometallic catalysts including metallocene catalysts. Butene-1-based polymers are commercially available. For example, isotactic poly(l-butene) is commercially available under the tradename Polybutene Resins or PB (Basell).

Other Constituents

In some embodiments, the thermoplastic vulcanizate may include a polymeric processing additive. The processing additive may be a polymeric resin that has a very high melt flow index. These polymeric resins include both linear and branched polymers that have a melt flow rate that is about 500 dg/min or more, such as about 750 dg/min or more, such as about 1000 dg/min or more, such as about 1200 dg/min or more, such as about 1500 dg/min or more. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers. Thermoplastic vulcanizates that include similar processing additives are disclosed in U.S. Pat. No. 6,451,915, which is incorporated herein by reference for purpose of U.S. patent practice.

In some embodiments, in addition to the rubber, thermoplastic resins, and optional processing additives, the thermoplastic vulcanizates of the present disclosure may optionally include reinforcing and non-reinforcing fillers, compatibilizers, antioxidants, stabilizers, rubber processing oil, lubricants, antiblocking agents, anti-static agents, waxes, foaming agents, pigments, flame retardants, nucleating agents, and other processing aids known in the rubber compounding art. These additives can comprise up to about 50 weight percent of the total composition.

Fillers and extenders that can be utilized include conventional inorganics such as calcium carbonate, clays, silica, talc, titanium dioxide, carbon black, a nucleating agent, mica, wood flour, and the like, and blends thereof, as well as inorganic and organic nanoscopic fillers.

In some embodiments, the thermoplastic vulcanizates may include an oil, such as a mineral oil, a synthetic oil, or a combination thereof. These oils may also be referred to as plasticizers or extenders. Mineral oils may include aromatic, naphthenic, paraffinic, and isoparaffinic oils, synthetic oils, and combinations thereof. In some embodiments, the mineral oils may be treated or untreated. Useful mineral oils can be obtained under the tradename SUNPAR™ (Sun Chemicals). Others are available under the name PARALUX™ (Chevron), and PARAMOUNT™ (Chevron). Other oils that may be used include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha olefinic synthetic oils, such as liquid polybutylene. Additive oils other than petroleum based oils can also be used, such as oils derived from coal tar and pine tar, as well as synthetic oils, e.g., polyolefin materials.

Examples of oils include base stocks. According to the American Petroleum Institute (API) classifications, base stocks are categorized in five groups based on their saturated hydrocarbon content, sulfur level, and viscosity index (Table A). Lube base stocks are typically produced in large scale from non-renewable petroleum sources. Group I, II, and III base stocks are all derived from crude oil via extensive processing, such as solvent extraction, solvent or catalytic dewaxing, and hydroisomerization, hydrocracking and isodewaxing, isodewaxing and hydrofinishing ["New Lubes Plants Use State-of-the-Art Hydrodewaxing Technology" in Oil & Gas Journal, Sep. 1, 1997; Krishna et al., "Next Generation Isodewaxing and Hydrofinishing Technology for Production of High Quality Base Oils", 2002 NPRA Lubricants and Waxes Meeting, Nov. 14-15, 2002; Gedeon and Yenni, "Use of "Clean" Paraffinic Processing Oils to Improve TPE Properties", Presented at TPEs 2000 Philadelphia, P A., Sep. 27-28, 1999].

Group III base stocks can also be produced from synthetic hydrocarbon liquids obtained from natural gas, coal or other fossil resources, Group IV base stocks are polyalphaolefins (PAOs), and are produced by oligomerization of alpha olefins, such as 1-decene. Group V base stocks include all base stocks that do not belong to Groups I-IV, such as naphthenics, polyalkylene glycols (PAG), and esters.

TABLE A

| API Classification | Group I | Group II | Group III | Group IV | Group V |
|---|---|---|---|---|---|
| % Saturates | <90 | ≥90 | ≥90 | Polyalpha-olefins (PAOs) | All others not belonging to Groups I-IV |
| % S | >0.03 | ≤0.03 | ≤0.03 | | |
| Viscosity Index (VI) | 80-120 | 80-120 | ≥120 | | |

In some embodiments, synthetic oils include polymers and oligomers of butenes including isobutene, 1-butene, 2-butene, butadiene, and mixtures thereof. In some embodiments, these oligomers can be characterized by a number average molecular weight (Mn) of from about 300 g/mol to about 9,000 g/mol, and in other embodiments from about 700 g/mol to about 1,300 g/mol. In some embodiments, these oligomers include isobutenyl mer units. Exemplary synthetic oils include polyisobutylene, poly(isobutylene-co-butene), and mixtures thereof. In some embodiments, synthetic oils may include polylinear α-olefins, poly-branched α-olefins, hydrogenated polyalphaolefins, and mixtures thereof.

In some embodiments, the synthetic oils include synthetic polymers or copolymers having a viscosity of about 20 cp or more, such as about 100 cp or more, such as about 190 cp or more, where the viscosity is measured by a Brookfield viscometer according to ASTM D-4402 at 38° C. In these or other embodiments, the viscosity of these oils can be about 4,000 cp or less, such as about 1,000 cp or less.

Useful synthetic oils can be commercially obtained under the tradenames Polybutene™ (Soltex; Houston, Tex.), and Indopol™ (Ineos). White synthetic oil is available under the tradename SPECTRASYN™ (ExxonMobil), formerly SHF Fluids (Mobil), Elevast™ (ExxonMobil), and white oil produced from gas to liquid technology such as Risella™ X 415/420/430 (Shell) or Primol™ (ExxonMobil) series of white oils, e.g. Primol™ 352, Primol™ 382, Primol™ 542, or Marcol™ 82, Marcol™ 52, Drakeol® (Pencero) series of white oils, e.g. Drakeol® 34 or combinations thereof. Oils described in U.S. Pat. No. 5,936,028 may also be employed.

Amounts

In some embodiments, the thermoplastic vulcanizates of the present disclosure contain a sufficient amount of the rubber to form rubbery compositions of matter. The skilled artisan will understand that rubbery compositions of matter include those that have ultimate elongations of about 100% or more, and that quickly retract to about 150% or less of their original length within about 10 minutes after being stretched to about 200% of their original length and held at about 200% of their original length for about 10 minutes.

Thus, in some embodiments, the thermoplastic vulcanizates can include about 25 wt % or more of rubber (i.e., dynamically-vulcanized rubber), such as about 45 wt % or more, such as about 65 wt % or more, such as about 75 wt % or more, based on the entire weight of the rubber and thermoplastic combined. In these or other embodiments, the amount of rubber within the thermoplastic vulcanizates can be from about 15 wt % to about 90 wt %, such as from about 45 wt % to about 85 wt %, such as from about 60 wt % to about 80 wt %, based on the entire weight of the rubber and thermoplastic combined.

In some embodiments, the amount of thermoplastic polymer (i.e., uncured polymer within the thermoplastic phase) within the thermoplastic vulcanizates can be from about 10 wt % to about 85 wt % (such as from about 10 wt % to about 40 wt %, such as from about 12 wt % to about 30 wt %) based on the entire weight of the rubber and thermoplastic combined. In these or other embodiments, the amount of thermoplastic polymer within the thermoplastic phase may be from about 25 parts by weight to about 250 parts by weight (such as from about 50 parts by weight to about 150 parts by weight, such as from about 60 parts by weight to about 100 parts by weight), per 100 parts weight rubber. In particular embodiments, the thermoplastic phase of the thermoplastic vulcanizates of the present disclosure includes 100% butene-1-based polymer.

With respect to the thermoplastic phase, the amount of butene-1-based polymer present within the phase may vary in the presence of a complementary thermoplastic resin. For example, in some embodiments, the thermoplastic phase may include from about 75 wt % to about 100 wt % butene-1-based polymer (such as from about 85 wt % to about 99 wt %, such as from about 95 wt % to about 98 wt %) based on the total weight of the thermoplastic phase, with balance of the thermoplastic phase including an ethylene-based polymer. For example, the thermoplastic phase may include from about 0 wt % to about 25 wt % an ethylene-based polymer (such as from about 1 wt % to about 15 wt %, such as from about 2 wt % to about 5 wt %) based on the total weight of the thermoplastic phase.

In these or other embodiments, where the thermoplastic phase may include a propylene-based polymer in addition to the butene-1-based polymer, the thermoplastic phase may include from about 51 wt % to about 100 wt % of butene-1-based polymer (such as from about 65 wt % to about 99.5 wt %, such as from about 85 wt % to about 99 wt %, such as from about 95 wt % to about 98 wt %) based upon the total weight of the thermoplastic phase, with balance of the thermoplastic phase including an propylene-based polymer. For example, in some embodiments, the thermoplastic phase may include from about 0 wt % to about 49 wt % of propylene-based polymer (such as from about 1 wt % to about 15 wt %, such as from about 2 wt % to about 5 wt %) based on the total weight of the thermoplastic phase.

With respect to the oil, and in some embodiments, the thermoplastic vulcanizate may include from about 5 parts by weight to about 300 parts by weight of extender oil per 100 parts rubber (such as from about 25 parts by weight to about 250 parts by weight, such as from about 50 parts by weight to about 200 parts by weight, such as from about 50 parts by weight to about 150 parts by weight, such as from about 75 parts by weight to about 130 parts by weight). The quantity of extender oil added can depend on the properties desired, with an upper limit that may depend on the compatibility of the particular oil and blend ingredients; this limit can be exceeded when excessive exuding of extender oil occurs. The amount of extender oil can depend, at least in part, upon the type of rubber. High viscosity rubbers are more highly oil extendable. Where ester plasticizers are employed, the ester plasticizers are generally used in amounts of about 250 parts or less, such as about 175 parts or less, per 100 parts rubber.

Fillers, such as carbon black, clay, talc, or calcium carbonate or mica or wood flour or combination thereof may be added in amount from about 1 parts by weight to about 250 parts by weight of filler, per 100 parts by weight of rubber (such as about 10 parts by weight to about 250 parts by weight, such as from about 10 parts by weight to about 150 parts by weight, such as from about 25 parts by weight to about 50 parts by weight). The amount of filler (e.g., carbon black) that can be used may depend, at least in part, upon the type of carbon black and the amount of extender oil that is used.

In some embodiments, in addition to the rubber, thermoplastic resins, and optional processing additives, the thermoplastic vulcanizates may optionally include reinforcing and non-reinforcing fillers, colorants, antioxidants, stabilizers, rubber processing oil, lubricants, antiblocking agents, anti-static agents, waxes, foaming agents, pigments, flame retardants, antistatic agents, slip masterbatches, ultraviolet inhibitors, antioxidants, and other processing aids known in the rubber and TPV compounding art. These additives can comprise up to about 50 weight percent of the total composition.

In some embodiments, the thermoplastic vulcanizates may include from about 10 wt % to about 85 wt % of the thermoplastic component (such as from about 15 wt % to about 70 wt %, such as from about 20 wt % to about 50 wt %) based upon the entire weight of the rubber and thermoplastic component combined. The amount of the thermoplastic component can also be expressed with respect to the amount of the rubber component. In some embodiments, the thermoplastic vulcanizates may include from about 20 parts by weight to about 400 parts by weight thermoplastic resin per 100 parts by weight rubber (such as from about 40 parts by weight to about 300 parts by weight, such as from about 80 parts by weight to about 200 parts by weight).

In some embodiments, the thermoplastic component includes about 0.1 wt % or more (such as about 0.25 wt % or more such as about 0.5 wt % or more, such as about 1.0 wt % or more) of the high viscosity, long-chain branched polyolefin with the remainder including the at least one other thermoplastic resin. On the other hand, the thermoplastic component includes about 5.0 wt % or less (such as about 4.75 wt % or less, such as about 4.5 wt % or less, such as about 4.0 wt % or less) of the high viscosity, long-chain branched polyolefin, with the remainder of the thermoplastic component including the at least one other thermoplastic resin.

In some embodiments, and when employed, the thermoplastic vulcanizates may include from about 0 parts by weight to about 20 parts by weight, such as from about 1 parts by weight to about 10 parts by weight, such as from about 2 parts by weight to about 6 parts by weight of a polymeric processing additive per 100 parts by weight rubber.

Preparation of Thermoplastic Vulcanizates

In some embodiments, the rubber is cured or crosslinked by dynamic vulcanization. The term dynamic vulcanization refers to a vulcanization or curing process for a rubber contained in a blend with a thermoplastic resin, wherein the rubber is crosslinked or vulcanized under conditions of high shear at a temperature above the melting point of the thermoplastic. The rubber can be cured by employing a variety of curatives. Exemplary curatives include phenolic resin cure systems, peroxide cure systems, and silicon-containing cure systems, such as hydrosilylation and silane grafting/moisture cure. Dynamic vulcanization can occur in the presence of the long-chain branched polyolefin, or the long-chain branched polyolefin can be added after dynamic vulcanization (i.e., post added), or both (i.e., some long-chain branched polyolefin can be added prior to dynamic vulcanization and some long-chain branched polyolefin can be added after dynamic vulcanization). The increase in crystallization temperature of the thermoplastic vulcanizate of some embodiments of the present disclosure can be advantageously increased when dynamic vulcanization occurs in the presence of the high viscosity, long-chain branched polyolefin.

In some embodiments, the rubber can be simultaneously crosslinked and dispersed as fine particles within the thermoplastic matrix, although other morphologies may also exist. Dynamic vulcanization can be effected by mixing the thermoplastic elastomer components at elevated temperature in conventional mixing equipment such as roll mills, stabilizers, Banbury mixers, Brabender mixers, continuous mixers, mixing extruders and the like. Methods for preparing thermoplastic vulcanizates are described in U.S. Pat. Nos. 4,311,628, 4,594,390, 6,503,984, and 6,656,693, although methods employing low shear rates can also be used. Multiple-step processes can also be employed whereby ingredients, such as additional thermoplastic resin, can be added after dynamic vulcanization has been achieved as disclosed in International Application No. PCT/US04/30517.

The skilled artisan will be able to readily determine a sufficient or effective amount of vulcanizing agent to be employed without undue calculation or experimentation.

As noted above, the thermoplastic vulcanizates prepared according to the present disclosure are dynamically vulcanized by a variety of methods including employing a phenolic resin cure system, a peroxide cure system, a maleimide cure system, a silicon-based cure system (including hydrosilylation cure system, a silane-based system such as a silane grafting followed by moisture cure), sulfur cure system, or a combination thereof.

Useful phenolic cure systems are disclosed in U.S. Pat. Nos. 2,972,600, 3,287,440, 5,952,425 and 6,437,030.

In some embodiments, phenolic resin curatives include resole resins, which can be made by the condensation of alkyl substituted phenols or unsubstituted phenols with aldehydes, such as formaldehydes, in an alkaline medium or by condensation of bi-functional phenoldialcohols. The alkyl substituents of the alkyl substituted phenols may contain between about 1 and about 10 carbon atoms, such as dimethylolphenols or phenolic resins, substituted in para-positions with alkyl groups containing between about 1 and about 10 carbon atoms. In some embodiments, a blend of octylphenol-formaldehyde and nonylphenol-formaldehyde resins are employed. The blend includes from about 25 wt % to about 40 wt % octylphenol-formaldehyde and from about 75 wt % to about 60 wt % nonylphenol-formaldehyde, such as from about 30 wt % to about 35 wt % octylphenol-formaldehyde and from about 70 wt % to about 65 wt % nonylphenol-formaldehyde. In some embodiments, the blend includes about 33 wt % octylphenol-formaldehyde and about 67 wt % nonylphenol-formaldehyde resin, where each of the octylphenol-formaldehyde and nonylphenol-formaldehyde include methylol groups. This blend can be solubilized in paraffinic oil at about 30% solids without phase separation.

Useful phenolic resins may be obtained under the tradenames SP-1044, SP-1045 (Schenectady International; Schenectady, N.Y.), which may be referred to as alkylphenol-formaldehyde resins.

An example of a phenolic resin curative includes that defined according to the general formula

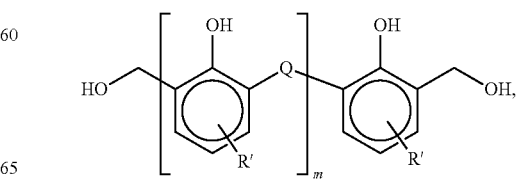

where Q is a divalent radical selected from the group consisting of —CH₂—, —CH₂—O—CH₂—; m is zero or a positive integer from 1 to 20 and R' is an organic group. In some embodiments, Q is the divalent radical —CH₂—O—CH₂—, m is zero or a positive integer from 1 to 10, and R' is an organic group having less than 20 carbon atoms. In other embodiments, m is zero or a positive integer from 1 to 10 and R' is an organic radical having between 4 and 12 carbon atoms.

In some embodiments, the phenolic resin is used in combination with a halogen source, such as stannous chloride, and metal oxide or reducing compound such as zinc oxide.

In some embodiments, the phenolic resin may be employed in an amount from about 2 parts by weight to about 6 parts by weight, such as from about 3 parts by weight to about 5 parts by weight, such as from about 4 parts by weight to about 5 parts by weight per 100 parts by weight of rubber. A complementary amount of stannous chloride may include from about 0.5 parts by weight to about 2.0 parts by weight, such as from about 1.0 parts by weight to about 1.5 parts by weight, such as from about 1.2 parts by weight to about 1.3 parts by weight per 100 parts by weight of rubber. In conjunction therewith, from about 0.1 parts by weight to about 6.0 parts by weight, such as from about 1.0 parts by weight to about 5.0 parts by weight, such as from about 2.0 parts by weight to about 4.0 parts by weight of zinc oxide may be employed. In some embodiments, the olefinic rubber employed with the phenolic curatives includes diene units deriving from 5-ethylidene-2-norbornene.

In some embodiments, useful peroxide curatives include organic peroxides. Examples of organic peroxides include di-tert-butyl peroxide, dicumyl peroxide, t-butylcumyl peroxide, α,α-bis(tert-butylperoxy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis (tert-butylperoxy) valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Useful peroxides and their methods of use in dynamic vulcanization of thermoplastic vulcanizates are disclosed in U.S. Pat. No. 5,656,693, which is incorporated herein by reference for purpose of U.S. patent practice.

In some embodiments, the peroxide curatives are employed in conjunction with a coagent. Examples of coagents include triallylcyanurate, triallyl isocyanurate, triallyl phosphate, sulfur, N-phenyl bis-maleamide, zinc diacrylate, zinc dimethacrylate, divinyl benzene, 1,2-polybutadiene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, and oximes such as quinone dioxime. In order to maximize the efficiency of peroxide/coagent crosslinking the mixing and dynamic vulcanization may be carried out in a nitrogen atmosphere.

In some embodiments, silicon-containing cure systems may include silicon hydride compounds having at least two Si—H groups. Silicon hydride compounds that are useful in practicing the present disclosure include methylhydrogenpolysiloxanes, methylhydrogendimethylsiloxane copolymers, alkylmethyl-co-methylhydrogenpolysiloxanes, bis(di-methylsilyl)alkanes, bis(dimethylsilyl)benzene, and mixtures thereof.

Useful catalysts for hydrosilylation include transition metals of Group VIII. These metals include palladium, rhodium, and platinum, as well as complexes of these metals. Useful silicon-containing curatives and cure systems are disclosed in U.S. Pat. Nos. 5,936,028, 4,803,244, 5,672,660, and 7,951,871.

In some embodiments, the silane-containing compounds may be employed in an amount from about 0.5 parts by weight to about 5.0 parts by weight per 100 parts by weight of rubber (such as from about 1.0 parts by weight to about 4.0 parts by weight, such as from about 2.0 parts by weight to about 3.0 parts by weight). A complementary amount of catalyst may include from about 0.5 parts of metal to about 20.0 parts of metal per million parts by weight of the rubber (such as from about 1.0 parts of metal to about 5.0 parts of metal, such as from about 1.0 parts of metal to about 2.0 parts of metal). In some embodiments, the olefinic rubber employed with the hydrosilylation curatives includes diene units deriving from 5-vinyl-2-norbornene.

The skilled artisan will be able to readily determine a sufficient or effective amount of vulcanizing agent to be employed without undue calculation or experimentation.

For example, a phenolic resin can be employed in an amount of about 2 parts by weight to about 10 parts by weight per 100 parts by weight rubber (such as from about 3.5 parts by weight to about 7.5 parts by weight, such as from about 5 parts by weight to about 6 parts by weight). In some embodiments, the phenolic resin can be employed in conjunction with stannous chloride and optionally zinc oxide. The stannous chloride can be employed in an amount from about 0.2 parts by weight to about 10 parts by weight per 100 parts by weight rubber (such as from about 0.3 parts by weight to about 5 parts by weight, such as from about 0.5 parts by weight to about 3 parts by weight). The zinc oxide can be employed in an amount from about 0.25 parts by weight to about 5 parts by weight per 100 parts by weight rubber (such as from about 0.5 parts by weight to about 3 parts by weight, such as from about 1 parts by weight to about 2 parts by weight).

Alternately, in some embodiments, a peroxide can be employed in an amount from about $1 \times 10^{-5}$ moles to about $1 \times 10^{-1}$ moles, such as from about $1 \times 10$ moles to about $9 \times 10^{-2}$ moles, such as from about $1 \times 10^{-2}$ moles to about $4 \times 10^{-2}$ moles per 100 parts by weight rubber. The amount may also be expressed as a weight per 100 parts by weight rubber. This amount, however, may vary depending on the curative employed. For example, where 4,4-bis(tert-butyl peroxy) diisopropyl benzene is employed, the amount employed may include from about 0.5 parts by weight to about 12 parts by weight, such as from about 1 parts by weight to about 6 parts by weight per 100 parts by weight rubber. The skilled artisan will be able to readily determine a sufficient or effective amount of coagent that can be used with the peroxide without undue calculation or experimentation. In some embodiments, the amount of coagent employed is similar in terms of moles to the number of moles of curative employed. The amount of coagent may also be expressed as weight per 100 parts by weight rubber. For example, where the triallylcyanurate coagent is employed, the amount employed can include from about 0.25 phr to about 20 phr, such as from about 0.5 phr to about 10 phr, based on 100 parts by weight rubber.

Characteristics of the Thermoplastic Vulcanizate Compositions

In some embodiments, the rubber can be highly cured. In some embodiments, the rubber is advantageously partially or fully (completely) cured. The degree of cure can be measured by determining the amount of rubber that is extractable from the thermoplastic vulcanizate by using cyclohexane or boiling xylene as an extractant. This method is disclosed in U.S. Pat. No. 4,311,628, which is incorporated herein by reference for purpose of U.S. patent practice. In some embodiments, the rubber has a degree of cure where not more than about 5.9 wt %, such as not more than about 5 wt %, such as not more than about 4 wt %, such as not more than about 3 wt % is extractable by cyclohexane at 23° C. as described in U.S. Pat. Nos. 5,100,947 and 5,157,081, which are incorporated herein by reference for purpose of U.S. patent practice. In these or other embodiments, the rubber is cured to an extent where greater than about 94 wt %, such as greater than about 95 wt %, such as greater than about 96 wt %, such as greater than about 97 wt % by weight of the rubber is insoluble in cyclohexane at 23° C. Alternately, in some embodiments, the rubber has a degree of cure such that the crosslink density is at least $4\times10^{-5}$ moles per milliliter of rubber, such as at least $7\times10^{-5}$ moles per milliliter of rubber, such as at least $10\times10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol. 68, pp. 573-584 (1995).

Despite the fact that the rubber may be partially or fully cured, the compositions of this disclosure can be processed and reprocessed by conventional plastic processing techniques such as extrusion, injection molding, blow molding, and compression molding. The rubber within these thermoplastic elastomers can be in the form of finely-divided and well-dispersed particles of vulcanized or cured rubber within a continuous thermoplastic phase or matrix. In some embodiments, a co-continuous morphology or a phase inversion can be achieved. In those embodiments where the cured rubber is in the form of finely-divided and well-dispersed particles within the thermoplastic medium, the rubber particles can have an average diameter that is about 50 µm or less (such as about 30 µm or less, such as about 10 µm or less, such as about 5 µm or less, such as about 1 µm or less). In some embodiments, at least about 50%, such as about 60%, such as about 75% of the particles have an average diameter of about 5 µm or less, such as about 2 µm or less, such as about 1 µm or less.

In some embodiments, the thermoplastic vulcanizates have one or more of the following characteristics:
1) An amount of an ethylene based rubber such as EPDM that is between about 10 wt % to about 90 wt % (such as between about 20 wt % and about 80 wt %) based on the total weight of the thermoplastic vulcanizate. The EPDM may be any EPDM described herein.
2) Includes a polyolefin, such as a polypropylene. In some embodiments, the polypropylene can be any polypropylene described herein. For example, a polypropylene that has an the MFR between about 0.1 g/10 min and about 50 g/10 min (such as between about 0.5 g/10 min and 10 g/10 min, such as between about 0.5 g/10 min and about 3 g/10 min), and a weight average molecular weight (Mw) between about 100,000 g/mol and about 1,000,000 g/mol (such as between about 100,000 g/mol and about 600,000 g/mol or between about 400,000 g/mol and about 800,000 g/mol), where the polypropylene includes a homopolymer, random copolymer, or impact copolymer polypropylene or a combination thereof. In some embodiments, the polypropylene is a high melt strength (HMS) long chain branched (LCB) homopolymer polypropylene.
3) A hardness that is between about 20 Shore A to about 60 Shore D, such as between about 40 Shore A and about 80 Shore A, such as between about 50 Shore A and about 70 Shore A.
4) A stress relaxation slope that is between about −1 and about −5 (1/min) (Elastocon), such as between about −2 and about −4.5 (1/min) (Elastocon).
5) A G' value (@ 90° C., 0.6 rad/s, and 1% strain) that is between about 600 kPa and about 2000 kPa, such as between about 700 kPa and about 1400 kPa.
6) A tan δ (@ 90° C., 5 rad/s, and 1% strain) that is between about 0.3 and about 1, such as between about 0.5 and about 0.9.
7) A tan δ value (@ 215° C., 5.0 rad/s, and 100% strain) of from about 0.25 to about 1.0, such as between about 0.35 and about 0.9, such as between about 0.4 and about 0.8, such as between about 0.5 and about 0.7.
8) A surface roughness that is between about 30 µin and about 150 µin, such as between about 50 µin and about 100 µin.
9) A die pressure (psi) that is between about 50 psi and about 300 psi, such as between about 70 psi and about 280 psi, such as between about 90 psi and about 230 psi based on runs on a 1.5" (screw diameter) Davis-Standard single screw extruder.
10) An output that is between about 4 kg/h and about 14 kg/h, such as between about 6 kg/h and about 12 kg/h, such as between about 7 kg/h and about 8 kg/h based on based on runs on a 1.5" (screw diameter) Davis-Standard single screw extruder.
11) An amount of amps that is between about 2 amps and about 10 amps, such as between about 3 amps and about lamps, such as between about 4 amps and about 6 amps based on runs on a 1.5" (screw diameter) Davis-Standard single screw extruder.
12) An amount of total surface spots that is between about 0 spots and about 50 spots, such as between about 0 spots and about 20 spots, such as between about 1 spot and about 9 spots.
13) A tension set that is between about 8% and about 19%, such as between about 10% and about 17%, such as between about 12% and about 15%, where tension set is measured as described below.
14) A compression set that is between about 30% and about 90%, such as between about 50% and about 80%, such as between about 50% and about 70%, where compression is measured as described below.
15) An elongation to break (%) that is between about 150% and about 600%, such as between about 150% and about 400%, such as between about 200% and about 350%.
16) A tensile strength that is between about 2 MPa and about 9 MPa, such as between about 2 MPa and about 8 MPa, such as between about 3 MPa and about 8 MPa.
17) A weight gain percent that is between about 30% to about 100%, such as between about 40% to about 80%, such as between about 50% to about 80%.

In some embodiments, an extruded tape comprising the thermoplastic vulcanizate composition is provided. The thermoplastic vulcanizate composition can be any thermoplastic vulcanizate composition described herein. In some embodiments, the thermoplastic vulcanizate composition of the extruded tape has a surface roughness of from about 30 µin to about 150 µin, such as from about 50 µin to about 100 µin.

In some embodiments, the thermoplastic vulcanizates of the present disclosure can be used in thermoforming processes. Thermoforming processes include blow molding (including injection blow molding, extrusion blow molding and press blow molding) and injection molding processes. As those skilled in the art appreciate, these thermoforming processes generally include heating a thermoplastic vulcanizate to a temperature that is equal to or in excess of the melt temperature of the thermoplastic vulcanizate to form a pre-form, forming the pre-form within a mold to form a molded part, cooling the molded part to a temperature at or below the crystallization temperature of the thermoplastic vulcanizate, and releasing the molded part from the mold.

For example, where a thermoplastic vulcanizate is injection blow molded, a parison of thermoplastic vulcanizate is formed by being molded onto a steel core pin contained within a hot runner mold known as an injection station. While still hot, the pin and parison are transferred to a blowing station where the parison is blown within a mold. The pin, plus the blown part, is then transferred to another station for ejection. In some embodiments, a three station machine is employed. Additional details respecting injection blow molding and extrusion blow molding can be found in THE BEKUM BLOW MOULDING HANDBOOK (Copyright 1989; Tony Whelan).

Another example includes injection molding. Within these processes, a melt of thermoplastic vulcanizate is injected from a reservoir through a runner into a cavity within a closed split mold. The mold cavity defines the shape of the molded part. The molded part is cooled within the mold at a temperature at or below the crystallization temperature of the thermoplastic vulcanizate, and the molded part can subsequently be ejected from the mold.

End Uses

The thermoplastic vulcanizates of this disclosure are useful for making a variety of molded and extruded articles such as weather seals (such as a glass run channel weather seal), door panels, hoses, belts, gaskets, moldings, boots, pipe seal, and like articles. They are particularly useful for making articles by blow molding, extrusion, injection molding, thermo-forming, elasto-welding and compression molding techniques. More specifically, they are useful for making vehicle parts such as weather seals, brake parts such as cups, coupling disks, and diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

In some embodiments, a method of forming an article includes extruding, injection molding, blow molding, compression molding, or thermoforming any thermoplastic vulcanizate composition described herein; and forming the article. Articles include those articles provided herein.

In some embodiments, a method of making any thermoplastic vulcanizate composition provided herein includes: introducing an elastomer to an extrusion reactor; introducing a thermoplastic resin to the extrusion reactor; introducing a filler, an additive, or a combination of filler and additive to the extrusion reactor; introducing a first amount of process oil to the extrusion reactor at a first oil injection location; introducing a curative to the extrusion reactor a location that is downstream of the first or second oil injection location (if second amount of oil injection is applicable); introducing a second amount of process oil to the extrusion reactor at a second oil injection location, where the second oil injection location is downstream of the location where the curative is introduced to the extrusion reactor; and dynamically vulcanizing the elastomer with the curative is in the presence of the thermoplastic resin to form the thermoplastic vulcanizate, wherein the thermoplastic vulcanizate comprises a rubber phase that is dispersed and at least partially cross linked within a continuous thermoplastic matrix.

In some embodiments, the extrusion reactor is a twin screw reactor. In some embodiments, an extruder throughput rate is 60 kg/hr or more, such as 70 kg/hr or more, such as 90 kg/hr or more.

EXPERIMENTAL

Sample Preparation Using Brabender Mixer

Thermoplastic vulcanizates were prepared by dynamically vulcanizing an elastomeric copolymer within a Brabender mixer using conventional procedures by effecting vulcanization with a phenolic resin (e.g., phenolic resin in oil curative that contains about 30 wt % phenolic resin and 70 wt % oil) in the presence of stannous chloride ($SnCl_2 \cdot 2H_2O$) and zinc oxide (ZnO). Specifically, thermoplastic vulcanizates were prepared in a laboratory Brabender-Plasticorder (model EPL-V5502). The mixing bowls had a capacity of 85 ml with the cam-type rotors employed. The rubber was initially added to the mixing bowl that was heated to 180° C. and at 100 rpm rotor speed. Subsequently, the plastic (typically polypropylene in pellet form), clay, black MB and zinc oxide were packed in to the mixer and melt mixed for two minutes. The paraffinic oil (pre-cure oil) was then added drop-wise over a minute, and mixing was continued for 1-5 minutes (a steady torque was obtained at this time) before the addition of the phenolic resin. The phenolic resin was then added to the mixing bowl, followed by the addition of stannous chloride MB, which caused an increase in motor torque due to occurrence of the curing reaction.

Mixing was continued for about 4 more minutes, after which the molten TPV was removed from the mixer, and pressed when hot between Teflon plates into a sheet which was cooled, cut-up, and compression molded at about 400° F. A Wabash press, model 12-1212-2 TMB was used for compression molding, with 4.5"×4.5"×0.06" mold cavity dimensions in a 4-cavity Teflon-coated mold. Material in the mold was initially preheated at about 400° F. (204.4° C.) for about 2-2.5 minutes at a 2-ton pressure on a 4" ram, after which the pressure was increased to 10-tons, and heating was continued for about 2-2.5 minutes more. The mold platens were then cooled with water, and the mold pressure was released after cooling (about 70° C.).

Sample Preparation Using a Twin Screw Extruder (TSE)

The following description explains the process employed in the following samples unless otherwise specified. A co-rotating, fully intermeshing type twin screw extruder, supplied by Coperion Corporation, Ramsey N.J., was used following a method similar to that described in U.S. Pat. No. 4,594,391 and US 2011/0028637 (excepting those altered conditions identified here). EPDM was fed into the feed throat of a ZSK 53 extruder of L/D (length of extruder over its diameter) of about 44. The thermoplastic resin (polypropylene) was also fed into the feed throat along with other reaction rate control agents such as zinc oxide and stannous chloride. Fillers, such as clay and black MB, were also added into the extruder feed throat. Process oil was injected into the extruder at two different locations along the extruder. The curative was injected into the extruder after the rubber, thermoplastics and fillers commenced blending at about an L/D of 18.7, but after the introduction of first process oil (pre-cure oil) at about an L/D of 6.5. In some examples, the curative was injected with the process oil, which oil may or may not have been the same as the other oil introduced to the extruder or the oil the rubber was extended with. The second process oil (post-cure oil) was injected into the extruder after the curative injection at about an L/D of 26.8. Rubber crosslinking reactions were initiated and controlled by balancing a combination of viscous heat generation due to application of shear, barrel temperature set point, use of catalysts, and residence time.

The extruded materials were fed into the extruder at a rate of 70 kg/hr and the extrusion mixing was carried out at 325 revolutions per minute (RPM), unless specified. A barrel metal temperature profile in ° C., starting from barrel section 2 down towards the die to barrel section 12 of 160/160/160/160/165/165/165/165/180/180/180/180° C. (wherein the last value is for the die) was used. Low molecular weight contaminants, reaction by-products, residual moisture and the like were removed by venting through one or more vent ports, typically under vacuum, as needed. The final product was filtered using a melt gear pump and a filter screen of desired mesh size. A screw design with several mixing sections including a combination of forward convey, neutral, left handed kneading blocks and left handed convey elements to mix the process oil, cure agents and provide sufficient residence time and shear for completing the cure reaction, without slip or surging in the extruder, were used.

GPC 4D Procedure: Molecular Weight, Comonomer Composition and Long Chain Branching Determination by GPC-IR Hyphenated with Multiple Detectors Unless otherwise indicated, the distribution and the moments of molecular weight (Mw, Mn, Mw/Mn, etc.), the comonomer content ($C_2$, $C_3$, $C_6$, etc.) and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80 μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS},$$

where the variables with subscript "PS" stand for polystyrene while those without a subscript are for the test samples. In this method, αPS=0.67 and KPS=0.000175 while α and K are for other materials as calculated and published in literature (Sun, T. et al., *Macromolecules*, 2001, 34, 6812), except that for purposes of the present disclosure, α=0.695 and K=0.000579 for linear ethylene polymers, α=0.705 and K=0.0002288 for linear propylene polymers, α=0.695 and K=0.000181 for linear butene polymers, a is 0.695 and K is 0.000579*(1-0.0087*w2b+0.000018*(w2b)^2) for ethylene-butene copolymer where w2b is a bulk weight percent of butene comonomer, αis 0.695 and K is 0.000579*(1-0.0075*w2b) for ethylene-hexene copolymer where w2b is a bulk weight percent of hexene comonomer, and a is 0.695 and K is 0.000579*(1-0.0077*w2b) for ethylene-octene copolymer where w2b is a bulk weight percent of octene comonomer. Concentrations are expressed in $g/cm^3$, molecular weight is expressed in g/mole, and intrinsic viscosity (hence K in the Mark-Houwink equation) is expressed in dL/g unless otherwise noted.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1-0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the equation $[\eta]=\eta_s/c$, where c is concentration and is determined from the IRS broadband channel output. The viscosity MW at each point is calculated as $$M=K_{PS}M^{\alpha_{PS}+1}/[\eta],$$

where $\alpha_p s$ is 0.67 and $K_{ps}$ is 0.000175.

The branching index ($g'_{vis}$) is calculated using the output of the GPC-IRS-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i},$$

where the summations are over the chromatographic slices, i, between the integration limits.

The branching index $g'_{vis}$ is defined as:

$$g'_{vis} = \frac{[\eta]_{avg}}{KM_v^\alpha},$$

where $M_v$ is the viscosity-average molecular weight based on molecular weights determined by LS analysis and the K and α are for the reference linear polymer, which are, for purposes of the present disclosure, α=0.700 and K=0.0003931 for ethylene, propylene, diene monomer copolymers, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1-0.0087*w2b+0.000018*(w2b)^2) for ethylene-butene copolymer where w2b is a bulk weight percent of butene comonomer, α is 0.695 and K is 0.000579*(1-0.0075*w2b) for ethylene-hexene copolymer where w2b is a bulk weight percent of hexene comonomer, and α is 0.695 and K is 0.000579*(1-0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

In some embodiments, the high viscosity, long-chain branched polyolefins employed in the present disclosure are prepared by converting solid, high molecular weight, linear, propylene polymer material with irradiating energy as disclosed in U.S. Pat. No. 5,414,027, which is incorporated herein by reference for purpose of U.S. patent practice. Other techniques include treatment of linear polymer with heat and peroxide as disclosed in U.S. Pat. No. 5,047,485, which is incorporated herein by reference for purpose of U.S. patent practice. Other useful high viscosity, long-chain branched polyolefins are disclosed in U.S. Pat. Nos. 4,916,198, 5,047,446, 5,570,595, and European Publication Nos. 0 190 889, 0 384 431, 0 351 866, and 0 634 441, which are also incorporated herein by reference for purpose of U.S. patent practice.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001, Vol. 34(19), pp. 6812-6820).

The comonomer composition is determined by the ratio of the IRS detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively.

$$w2=f*SCB/1000TC$$

The bulk composition of the polymer from the GPC-IR and GPC-4D analyses is obtained by considering the entire signals of the CH3 and CH2 channels between the integration limits of the concentration chromatogram. First, the following ratio is obtained.

$$\text{Bulk } IR \text{ ratio} = \frac{\text{Area of } CH_3 \text{ signal within integration limits}}{\text{Area of } CH_2 \text{ signal within integration limits}}$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk $CH_3$end/1000TC) is obtained by weight-averaging the chain-end correction over the molecular-weight range. Then $$w2b = f*CH3/1000TC$$

$$\text{bulk } SCB/1000TC = CH3/1000TC - \text{bulk} \frac{CH3 \text{ end}}{1000TC},$$

and bulk SCB/1000TC is converted to bulk w2 in the same manner as described above.

Phase Angle and Δδ from Small Amplitude Oscillatory Shear (SAOS)

The rheological measurements properties of the EPDMs were measured by small amplitude oscillatory shear (SAOS) measurements. The SAOS measurements were completed on an Alpha Technologies ATD1000 using 25 mm parallel plates with a gap of 2.5 mm. The EPDM samples were prepared by drying in a vacuum oven at a temperature of 60° C. for 8 h. A 5 gram quantity material was placed between two 0.001" polyester sheets (Alpha part #F0141) to prevent the samples from sticking to the parallel plate fixture. The material was allowed to melt for 30 s prior to closing the fixture. The first shear measurement was made after 4.5 min of clamping inside the fixture. The dynamic properties of the polymer were characterized in the frequency range from 0.1 rad/s to 256 rad/s (logarithmic scaling). The applied stresses and deformations are within the limits of linear viscoelasticity. The oscillatory measurements were used to measure phase angle δ as a function of frequency. The Δδ parameter is defined as the difference between the phase angle (δ) at frequencies of 0.1 and 128 rad/s, as derived from a frequency sweep at 125° C.

The non-linear rheological measurements properties of the EPDMs were measured by large amplitude oscillatory shear (LAOS) measurements. The LAOS measurements were completed on an Alpha Technologies ATD1000 using 25 mm parallel plates with a gap of 2.5 mm. The EPDM samples were prepared by drying in a vacuum oven at a temperature of 60° C. for 8 h. A 5 gram quantity material was placed between two 0.001" polyester sheets (Alpha part #F0141) to prevent the samples from sticking to the parallel plate fixture. The material was allowed to melt for 30 s prior to closing the fixture. The first shear measurement was made after 4.5 min of clamping inside the fixture. The large amplitude oscillatory properties of the polymer was characterized using a frequency of 0.63 rad/s and strain amplitude of 1000%. The storage modulus associated with different modes or harmonic can be extracted by using a Fourier transformation of the stress-strain curves, e.g. see Hyun et al., "A review of nonlinear oscillatory shear tests: Analysis and application of large amplitude oscillatory shear (LAOS), Progress in Polymer Science, Vol. 36, Issue 12, pp. 1697-1753, 2011. The corresponding storage modulus associated with each harmonic can be defined as $G'_1$, $G'_2$, $G'_3$, etc. The LAOS measurements were used to measure first, third and fifth harmonics. The LAOS branching index (BI) is defined as [T. Rauschumann, "Linear and Non Linear Rheological Measurements on Rubber Polymers and Compounds", presentation given at Innovations in Rubber Design Conference (organized by Rubber in Engineering Group), Hamilton Pl, London W1J 7BQ, Dec. 6-7, 2016]:

$$BI = \frac{G'_1}{G'_5} - E_3$$

$$E_3 = \frac{5}{4} + \frac{1}{4}\left(\frac{G'_3}{G'_5}\right)^2 - \frac{1}{2}\left(\frac{G'_3}{G'_5}\right)$$

where $G_1$ corresponds to $1^{st}$ harmonic storage modulus, $G_3$ the $2^{nd}$ harmonic storage modulus, and G'5 the $3^{rd}$ harmonic storage modulus.

Shore A Hardness was measured using a Zwick automated durometer according to ASTM D2240 (15 sec. delay). Shore D Hardness was measured using a Zwick automated durometer according to ASTM D2240.

Ultimate tensile strength ("UTS"), modulus at 100% extension ("M100"), and ultimate elongation ("UE") were measured on injection molded plaques according to ASTM D-412 at 23° C. (unless otherwise specified) at 50 mm per minute by using an Instron testing machine.

The Tension Set was measured at 70° C. and for 22 h by applying a 50% Strain. The samples are taken out under tension and allowed to cool for 2 h. The measurements are performed 30 min after releasing from tension.

The compression set was measured at 70° C. and for 94 h by applying a 50% deflection on a 3 layer plied stack. The samples are taken out under compression and allowed to cool for 3 h under compression. The measurements are performed within 5 s after releasing from compression.

Rheological properties of the TPVs were measured by small angle oscillatory shear measurements. The SAOS measurements were completed on an Alpha Technologies ATD 1000 using serrated 25 mm parallel plates with a gap of 2.5 mm. The TPV samples were prepared for the test by placing the sample in a vacuum oven at a temperature between 60° C. and 70° C. for between 8 and 12 hours prior to analysis. 5 gram quantities of the material were then placed between two 0.001" polyester sheets (Alpha part #F0141) to prevent the samples from sticking to the parallel plate fixture. The material was allowed to melt for 30 seconds prior to closing the fixture. The first shear measurement was made after 4.5 minutes of clamping inside the fixture. Bulk Modulus components and shear viscosity components from each run were calculated by the machine software (Workbench v 5.70 published by Alpha Technologies). The G' was measured at 1% strain, 0.6 rad/s, 90° C. Tan Delta was measured at 1% strain, 0.6 rad/s, 90° C.

Extrusion surface roughness ("ESR") in micro inches was measured as follows: approximately 1 kg (2 lbs.) of the TPV to be tested was fed into a 1" or 1.5" diameter extruder (Davis-Standard) equipped with a 24:1 L/D screw having a 3.0 to 3.5 compression ratio. The extruder was fitted with a strip die 25.4 mm (1") wide×0.5 mm (0.019") thick×7 to 10 mm (0.25 to 0.40") length. A breaker plate was used with the die, but no screen pack was placed in front of the breaker plate. Temperature profiles of the extruder were as follows: Zone 1=180° C. (feed Zone); Zone 2=190° C. (feed Zone); Zone 3-200° C. (feed Zone); Zone 4-205° C. (die Zone). When the zone temperatures were reached, the screw was activated. Screw speed was set to maintain an output of approximately 50 grams per minute during material purging. For the first 5 minutes of extrusion the extruder was flushed and the extruded material was discarded. A strip approximately 30.5 cm (12") in length was extruded on a flat substrate placed directly under and touching the underside of the die. Three representative samples were collected in this manner and ESR was measured on the samples using a model EMD-04000 W5 Surfanalyzer System 4000 including a universal probe 200 mg stylus force and a Surfanalyzer proper tip type EPT-01049 (0.025 mm (0.0001") stylus radius).

Total surface spots was measured as follows: approximately 1 kg (2 lbs.) of the TPV to be tested was fed into a 1" or 1.5" diameter extruder. The extruder was fitted with a strip die 25.4 mm (1") wide×0.5 mm (0.019") thick×7 to 10 mm (0.25 to 0.40") length. Temperature profiles of the extruder were as follows: Zone 1=180° C. (feed Zone); Zone 2=190° C. (feed Zone); Zone 3-200° C. (feed Zone); Zone 4-205° C. (die Zone). Three representative samples were collected in this manner and total surface spots was measured on the samples by visually examining and counting surface spots using a 100 watt illumination with 1.75 power magnification. Average number of total surface spots greater than 0.8 mm$^2$ was determined according to the TAPPI chart.

Stress relaxation slope was measured in compression according to ISO 3384A using an Elastocon stress relaxation tester. The samples are plied up to 2 mm thickness and compressed to 10% deflection at 70° C. and for 24 h. A plot of normalized force (normalized with respect to force @ t=0.01 s) as a function of time was constructed. The slope of this plot is defined as stress relaxation slope and has units of 1/min.

The weight gain % was measured according to ASTM D471 for 24 h and at 121° C. using IRM903 oil.

In order to demonstrate the practice of the present disclosure, the following examples have been prepared and tested. The examples should not, however, be viewed as limiting the scope of the present disclosure.

EXAMPLES

Preparation of the examples and comparatives are provided above. All samples made with the Brabender mixer were tested on compression molded plaques, while all test samples made with the twin screw extruder (TSE) were tested on injection molded plaques. Comparative 1-6 and Examples 1-10 were prepared on a Brabender mixer. Comparatives 7-9 and Examples 11-18 were prepared on a TSE. Examples 19-21 were also prepared on a TSE.

"$SnCl_2$-45 wt % MB" is an anhydrous stannous chloride polypropylene masterbatch. The $SnCl_2$ MB contains 45 wt % stannous chloride and 55 wt % of polypropylene having an MFR of 0.8 g/10 min (ASTM D1238; 230° C. and 2.16 kg weight).

Zinc oxide (ZnO) was Kadox 911.

The phenolic curative (a phenolic resin in oil, 30 wt % phenolic resin and 70 wt % oil) was a resole-type resin obtained from Schenectady International.

Fillers were Ampacet 49974 black MB (available from Ampacet Corp.) referred to below as black MB and Icecap™ K Clay (available from Burgess).

Table 3 sets forth the ingredients and amounts (parts per hundred rubber, phr) employed used in each sample and the results of physical testing that was performed on each sample. Those samples that correspond with the present disclosure are designated with "Ex.," and those that are comparative are designated with the letter "C."

The elastomeric (rubber) terpolymer was an EPDM (Vistalon 3666, Nordel 6555, Suprene 512F, Royalene 694, Royalene 677, Keltan 4869C, Keltan 5469C, Keltan 5469Q, Keltan 4969Q), and the molecular properties of each EPDM is provided above. One of the used polypropylenes was obtained under the trade name PP5341™ (ExxonMobil), and the molecular properties of the polypropylene are described above. The paraffinic oil was Paramount 6001R (Chevron Phillips). The filler was Ampacet 49974 black MB and Icecap K Clay.

As shown in Table 3, the Example TPV show higher hardness, higher elongation at break, higher tensile strength, lower tension set and lower weight gain. The Comparative TPV compositions show lower hardness, lower tensile strength, lower elongation at break, higher tension set, and higher weight gain. For example, Example TPV compositions have a 25-30% decrease in tension set at similar or higher hardness and improved tensile properties (elongation to break, modulus) as well as reduced weight gain (an indication of higher cure state and improved oil resistance) relative to the Comparative TPV compositions. As such, the Example TPV compositions surprisingly show a significantly improved and unexpected balance of properties.

TABLE 3

Example and Comparative TPV Compositions Based on Brabender Evaluations

| Formulation (phr) | C1 | C2 | C3 | C4 | Ex. 1 | Ex. 2 | Ex. 3 | Ex. 4 | Ex. 5 |
| --- | --- | --- | --- | --- | --- | --- | --- | --- | --- |
| Vistalon 3666 | 175 | | | | | | | | |
| Nordel 6555 | | 124 | | | | | | | |
| Suprene 512F | | | 100 | | | | | | |
| Royalene 694 | | | | 175 | | | | | |
| Royalene 677 | | | | | 200 | | | | |
| Keltan 4869C | | | | | | 200 | | | |
| Keltan 5469C | | | | | | | 200 | | |
| Keltan 5469Q | | | | | | | | 200 | |
| Keltan 4969Q | | | | | | | | | 200 |
| PP5341 | 26.97 | 26.97 | 26.97 | 26.97 | 26.97 | 26.97 | 26.97 | 26.97 | 26.97 |
| Ampacet 49974 black MB | 23.96 | 23.96 | 23.96 | 23.96 | 23.96 | 23.96 | 23.96 | 23.96 | 23.96 |
| Icecap K Clay | 42 | 42 | 42 | 42 | 42 | 42 | 42 | 42 | 42 |
| ZnO | 1.5 | 1.5 | 1.5 | 1.5 | 1.5 | 1.5 | 1.5 | 1.5 | 1.5 |
| $SnCl_2$ 45%-MB | 1.67 | 1.67 | 1.67 | 1.67 | 1.67 | 1.67 | 1.67 | 1.67 | 1.67 |
| Phenolic resin in Oil | 7.56 | 7.56 | 7.56 | 7.56 | 7.56 | 7.56 | 7.56 | 7.56 | 7.56 |
| Paramount 6001R | 68.82 | 119.82 | 143.82 | 68.82 | 43.82 | 43.82 | 43.82 | 43.82 | 43.82 |
| Total | 347.5 | 347.5 | 347.5 | 347.5 | 347.5 | 347.5 | 347.5 | 347.5 | 347.5 |
| Hardness, Shore A | 51 | 45 | 41 | 56 | 57 | 55 | 57 | 57 | 55 |
| Stress at 100% Strain, MPa | 1.7 | 1.7 | 1.2 | 2.4 | 2.0 | 2.1 | 2.0 | 2.0 | 2.0 |
| Tensile Strength, MPa | 3.2 | 2.5 | 2.4 | 5.4 | 6.0 | 6.1 | 5.1 | 5.8 | 5.3 |
| Elongation at break, % | 250 | 200 | 350 | 300 | 370 | 425 | 350 | 325 | 350 |
| Tension set, % | 21 | 20 | 39 | 19 | 18 | 16 | 13.5 | 13 | 15 |
| Wt Gain, % (24 h@121° C.) | 96 | 111 | 166 | 76 | 75 | 82 | 82 | 77 | 76 |

Table 4 provides ingredients and amounts (phr) that were employed in sample using two high melt strength polypropylenes (Achieve™ PP6282NE1 and PHD025). Table 4 also shows the results of physical testing that was performed on each sample. Those samples that correspond with the present disclosure are designated with "Ex.," and those that are comparative are designated with the letter "C". The elastomeric terpolymer was an EPDM (Vistalon 3666, Keltan 5469Q, Keltan 4969Q), and the molecular properties of each EPDM is provided above. The polypropylenes were ExxonMobil Achieve™ PP6282NE1, PDH025 (US2018/0016414 A1; US2018/0051160 A1), Waymax MFX6, Borealis Daploy WB140, Braskem Ampleo 1025MA, and the molecular properties of each polypropylene is provided above. The paraffinic oil was Paramount 6001R. The filler was Black MB and Icecap K Clay.

TABLE 4

Example and Comparative TPV Compositions based on Brabender Evaluations with High Melt Strength Polypropylene

| Formulation (phr) | C5 | C6 | Ex. 6 | Ex. 7 | Ex. 8 | Ex. 9 | Ex. 10 |
|---|---|---|---|---|---|---|---|
| Vistalon 3666 | 175 | | 175 | | | | |
| Keltan 5469Q | | 200 | | 200 | 200 | 200 | 200 |
| Keltan 4969Q | | | | | | | |
| Achieve ™ PP6282NE1 | 26.97 | 26.97 | | | | | |
| PDH025 | | | 26.97 | 26.97 | | | |
| Waymax MFX6 | | | | | 26.97 | | |
| Borealis Daploy WB140 | | | | | | 26.97 | |
| Braskem Ampleo 1025MA | | | | | | | 26.97 |
| Black MB | 23.96 | 23.96 | 23.96 | 23.96 | 23.96 | 23.96 | 23.96 |
| Clay | 42 | 42 | 42 | 42 | 42 | 42 | 42 |
| ZnO | 1.5 | 1.5 | 1.5 | 1.5 | 1.5 | 1.5 | 1.5 |
| SnCl₂ 45%-MB | 1.67 | 1.67 | 1.67 | 1.67 | 1.67 | 1.67 | 1.67 |
| Phenolic resin in Oil | 7.56 | 7.56 | 7.56 | 7.56 | 7.56 | 7.56 | 7.56 |
| Paramount 6001R | 68.82 | 43.82 | 68.82 | 43.82 | 43.82 | 43.82 | 43.82 |
| Total | 347.5 | 347.5 | 347.5 | 347.5 | 347.5 | 347.5 | 347.5 |
| Hardness, Shore A | 52 | 57 | 50 | 55 | 55 | 52 | 54 |
| Stress at 100% Strain, MPa | 1.7 | 2.1 | 1.7 | 2.2 | 2.1 | 2.0 | 1.9 |
| Tensile Strength, MPa | 2.7 | 4.9 | 2.8 | 4.4 | 5.4 | 4.4 | 4.4 |
| Elongation at break, % | 190 | 330 | 200 | 240 | 320 | 270 | 280 |
| Tension set, % | 22 | 13 | 19 | 12 | 13 | 11.5 | 10.5 |
| Wt Gain, % (24 h@121° C.) | 99 | 75 | 90 | 73 | 74 | 78 | 77 |

As shown in Table 4, the Example TPV show higher hardness, higher elongation at break, higher tensile strength, lower tension set, and lower weight gain. The Comparative TPV compositions show lower hardness, lower tensile strength, lower elongation at break, higher tension set, and higher weight gain as well as reduced weight gain (an indication of higher cure state and improved oil resistance). For example, Example TPV compositions have a 25-30% decrease in tension set at higher or similar hardness and improved tensile properties (elongation to break, modulus) relative to the Comparative TPV compositions. As such, the Example TPV compositions show a significantly improved and unexpected balance of properties.

Table 5 provides ingredients and amounts (phr) that were employed in samples prepared through twin screw extrusion (TSE). Table 5 also shows the results of physical testing that was performed on each sample. Those samples that correspond with the present disclosure are designated with "Ex.," and those that are comparative are designated with the letter "C". The elastomeric terpolymer was an EPDM (Vistalon 3666, Royalene 694, Royalene 677, Keltan 4869C, Keltan 5469C, Keltan 5469Q, Keltan 4969Q), and the molecular properties of each EPDM is provided above. The polypropylene was obtained under the trade name PP5341™ (ExxonMobil), and the molecular properties of the polypropylene are described above. The paraffinic oil was Paramount 6001R. The filler was Black MB and Icecap K Clay.

A comparative TPV (Santoprene™ 121-58W175, available from ExxonMobil) was also examined as Comparative 7.

TABLE 5

Example and Comparative TPV Compositions Prepared through TSE

| Formulation (phr) | C7 | C8 | C9 | Ex. 11 | Ex. 12 | Ex. 13 | Ex. 14 | Ex. 15 |
|---|---|---|---|---|---|---|---|---|
| Vistalon 3666 | | 175 | | | | | | |
| Royalene 694 | | | 175 | | | | | |
| Royalene 677 | | | | 200 | | | | |
| Keltan 4869C | | | | | 200 | | | |
| Keltan 5469C | | | | | | 200 | | |
| Keltan 5469Q | | | | | | | 200 | |
| Keltan 4969Q | | | | | | | | 200 |
| PP5341 | | 26.97 | 26.97 | 26.97 | 26.97 | 26.97 | 26.97 | 26.97 |
| Black MB | | 23.96 | 23.96 | 23.96 | 23.96 | 23.96 | 23.96 | 23.96 |
| Clay | | 42 | 42 | 42 | 42 | 42 | 42 | 42 |
| ZnO | | 1.5 | 1.5 | 1.5 | 1.5 | 1.5 | 1.5 | 1.5 |
| SnCl₂-45% MB | | 1.67 | 1.67 | 1.67 | 1.67 | 1.67 | 1.67 | 1.67 |
| Phenolic resin in Oil | | 7.56 | 7.56 | 7.56 | 7.56 | 7.56 | 7.56 | 7.56 |
| Paramount 6001R | | 68.82 | 68.82 | 43.82 | 43.82 | 43.82 | 43.82 | 43.82 |
| Total | | 347.5 | 347.5 | 347.5 | 347.5 | 347.5 | 347.5 | 347.5 |
| Hardness, Shore A | 62 | 60 | 61 | 63 | 63 | 62 | 62 | 63 |
| Tensile Strength, MPa | 5.3 | 4.2 | 5.1 | 4.5 | 5.9 | 6.1 | 5.8 | 5.9 |
| Elongation at break, % | 430 | 350 | 360 | 280 | 400 | 450 | 400 | 395 |
| Tension set, % | 21 | 24 | 22 | 18 | 19 | 16 | 15 | 17 |
| Compression set, % | | 80 | | 77 | 74 | 72 | 67 | 72 |
| Wt Gain, % (24 h @ 121° C.) | 74 | 79 | 74 | 67 | 65 | 71 | 70 | 62 |

TABLE 5-continued

Example and Comparative TPV Compositions Prepared through TSE

| Formulation (phr) | C7 | C8 | C9 | Ex. 11 | Ex. 12 | Ex. 13 | Ex. 14 | Ex. 15 |
|---|---|---|---|---|---|---|---|---|
| ESR, μin (Ra) | 85 | 41 | 78 | 59 | 67 | 69 | 73 | 77 |
| Die Pressure (psi) | 265 | 135 | 230 | 360 | 214 | 175 | 168 | 290 |
| G' (@ 90° C.), kPa (Strain 1%) | | 944 | 920 | 1122 | | | 1200 | 1120 |
| tanδ (@ 90° C.) (Strain 1%) | | 0.065 | 0.05 | 0.036 | | | 0.030 | 0.035 |

C7 is commercial Santoprene ™ TPV grade 121-58W175.

As shown in Table 5, the Example TPV show higher hardness, higher elongation at break, higher tensile strength, lower tension set and lower weight gain as well as reduced weight gain (an indication of higher cure state and improved oil resistance). The Comparative TPV compositions show lower hardness, lower tensile strength, lower elongation at break, higher tension set, and higher weight gain. For example, Example TPV compositions have a 25-30% decrease in tension set at higher or similar hardness and improved tensile properties (elongation to break, modulus) relative to the Comparative TPV compositions including. The Example TPV compositions also show improved properties for ESR, Die Pressure, G, and tan δ, with improved characteristics measured as a lower ESR, lower Die Pressure, higher G', and lower tan δ. As such, the Example TPV compositions surprisingly show a significantly improved balance of properties.

Table 6 provides ingredients and amounts (phr) that were employed in samples prepared through TSE. Table 6 also shows the results of physical testing that was performed on each sample. Those samples that correspond with the present disclosure are designated with "Ex." The elastomeric terpolymer was an EPDM (Royalene 677, Keltan 5469Q, Keltan 4969Q), and the molecular properties of each EPDM is provided above. The polypropylene was PDH025 (a high melt strength PP described in US20180016414 and US20180051160), and the molecular properties of the polypropylene are described above. The paraffinic oil was Paramount 6001R. The fillers were Black MB and Clay.

TABLE 6

Example TPV Compositions Prepared through TSE

| Formulation (phr) | Ex. 16 | Ex. 17 | Ex. 18 |
|---|---|---|---|
| Keltan 5469Q | 200 | | |
| Royalene 677 | | 200 | |
| Keltan 4969Q | | | 200 |
| PDH025 | 26.97 | 26.97 | 26.97 |
| Black MB | 23.96 | 23.96 | 23.96 |
| Clay | 42 | 42 | 42 |
| ZnO | 1.5 | 1.5 | 1.5 |
| SnCl$_2$-45% MB | 1.67 | 1.67 | 1.67 |
| Phenolic resin in Oil | 7.56 | 7.56 | 7.56 |
| Paramount 6001R | 43.82 | 43.82 | 43.82 |
| Total | 347.5 | 347.5 | 347.5 |
| Hardness, Shore A | 61 | 63 | 63 |
| Tensile Strength, MPa | 5.7 | 5.9 | 5.2 |
| Elongation at break, % | 390 | 400 | 325 |
| Tension set, % | 15 | 17 | 14 |
| Compression set, % | 67 | | 64 |
| Wt Gain, % (24 h @ 121° C.) | 69 | 70 | 59 |
| ESR, μin (Ra) | 86 | 68 | 80 |
| Die Pressure (psi) | 295 | 265 | 320 |
| G' (@ 90° C.), kPa (Strain 1%) | 1119 | 1112 | 1100 |
| tanδ (@ 90° C.) (Strain 1%) | 0.033 | 0.038 | 0.032 |

As shown in Table 6, the Example TPV show higher hardness, higher elongation at break, higher tensile strength, lower tension set and lower weight gain (an indication of higher cure state and improved oil resistance). The Example TPV compositions surprisingly have a lower tension set (improved elasticity and resilience) at higher or similar hardness and improved tensile properties (elongation to break, modulus) relative to the Comparative TPV compositions shown in the other tables. The Example TPV compositions also show improved properties for ESR, Die Pressure, G, and tan δ, with improved characteristics measured as a lower ESR, lower Die Pressure, higher G', and lower tan δ. As such, the Example TPV compositions show a significantly improved balance of properties.

Table 7 provides the ingredients and amounts (phr) that were employed in each sample using higher amounts of curative. Table 7 also shows the results of physical testing that was performed on each sample. Those samples that correspond with the present disclosure are designated with "Ex". The elastomeric terpolymer was an EPDM (Keltan 5469Q, Keltan 4969Q), and the molecular properties of each EPDM is provided above. The polypropylene was PP5341 or high melt strength PP PDH025 (described in US 20180016414 and US 20180051160), and the molecular properties of the polypropylene are described above. The paraffinic oil was Paramount 6001R. The fillers were Black MB and Clay.

TABLE 7

Example TPV Compositions Prepared with Higher Amounts of Curative

| Formulation (phr) | Ex. 19 | Ex. 20 | Ex. 21 |
|---|---|---|---|
| Keltan 5469Q | 200 | 200 | |
| Keltan 4969Q | | | 200 |
| PP5341 | 26.97 | | |
| PDH025 | | 26.97 | 26.97 |
| Black MB | 23.96 | 23.96 | 23.96 |
| Clay | 42 | 42 | 42 |
| ZnO | 1.5 | 1.5 | 1.5 |
| SnCl$_2$-45% MB | 2.51 | 2.51 | 2.51 |
| Phenolic resin in Oil | 11.34 | 11.34 | 11.34 |
| Paramount 6001R | 43.82 | 43.82 | 43.82 |
| Total | 347.5 | 347.5 | 347.5 |
| Hardness, Shore A | 63 | 65 | 64 |
| Tensile Strength, MPa | 6.2 | 5.9 | 5.7 |

TABLE 7-continued

Example TPV Compositions Prepared
with Higher Amounts of Curative

| Formulation (phr) | Ex. 19 | Ex. 20 | Ex. 21 |
|---|---|---|---|
| Elongation at break, % | 380 | 340 | 320 |
| Tension set, % | 15 | 14 | 14 |
| Compression set, % | 65 | 62 | 62 |
| Wt Gain, % (24 h @ 121° C.) | 62 | 60 | 55 |
| ESR, µin (Ra) | 73 | 89 | 76 |
| Die Pressure (psi) | 490 | 410 | 290 |
| G' (@ 90° C.), kPa (Strain 1%) | 1055 | 1205 | 1250 |
| tan δ (@ 90° C.) (Strain 1%) | 0.05 | 0.027 | 0.032 |

As shown in Table 7, the Example TPV show higher hardness, higher elongation at break, higher tensile strength, lower tension set and lower weight gain (an indication of higher cure state and improved oil resistance). The Example TPV compositions have an improved (lower)tension set at higher or similar hardness and improved tensile properties (elongation to break, modulus) relative to the Comparative TPV compositions shown in the other tables. The Example TPV compositions also show improved properties for ESR, Die Pressure, G, and tan δ, with improved characteristics measured as a lower ESR, lower Die Pressure, higher G', and lower tan δ. As such, the Example TPV compositions surprisingly show a significantly improved balance of properties.

Table 8 shows extrusion performance and surface appearance characteristics of Example and Comparative TPV compositions. Those samples that correspond with the present disclosure are designated with "Ex.," and those that are comparative are designated with the letter "C". Table 8 shows that the Example TPV compositions surprisingly exhibit similar or improved strip surface roughness and significantly reduced surface spots, thus significantly improved surface appearance over the Comparative TPV compositions.

TABLE 8

Extrusion Performance and Surface Appearance Characteristics
of Example and Comparative TPV Compositions.

| Parameters | C1 | Santoprene 121-58W175 (C7) | Ex. 11 | Ex. 14 |
|---|---|---|---|---|
| Surface roughness (µin) | 58 | 79 | 67 | 73 |
| Total surface spots | 40 | 16 | 1 | 9 |

The present disclosure provides for thermoplastic vulcanizate compositions that include an ethylene-based elastomer (such as ethylene-propylene-diene terpolymer) and a polyolefin (such as a polypropylene). The TPV compositions may include one or more of filler, oil, and a curing system. Herein, this disclosure provides for improved thermoplastic vulcanizate compositions when the EPDM component of the thermoplastic vulcanizate compositions has the following molecular characteristics before the curing: a molecular weight of from about 500,000 g/mol to about 3,000,000 g/mol; Mw/Mn of 4.0 or lower; an ethylene content of about 70 wt % or lower, based on the total weight of the EPDM; and a $g'_{vis}$ of 0.90 or greater (GPC-4D); a Δδ of from 30 to 80 degrees from small amplitude oscillatory shear; and a large amplitude oscillatory shear branching index of less than 3. These thermoplastic vulcanizate compositions advantageously demonstrate many of the properties of thermoset elastomers while retaining the processability of thermoplastics. For example, the thermoplastic vulcanizate compositions exhibit superior elastic properties (low tension and compression sets, high stress relaxation) at similar or higher hardness and tensile properties (tensile strength, modulus, and elongation to break) when compared to similar TPVs produced using high MW EPDMs obtained via solution polymerization with a $g'_{vis}$ less than 0.9, Δδ less than 30 degrees, and a LAOS branching index greater than 3. Moreover, the thermoplastic vulcanizate compositions surprisingly have superior surface appearance and extrusion characteristics.

All documents described herein are incorporated by reference herein, including any priority documents and/or testing procedures to the extent they are not inconsistent with this text. As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "I"" preceding the recitation of the composition, element, or elements and vice versa, e.g., the terms "comprising," "consisting essentially of," "consisting of" also include the product of the combinations of elements listed after the term.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present disclosure. Further, all documents and references cited herein, including testing procedures, publications, patents, journal articles, etc. are herein fully incorporated by reference for all jurisdictions in which such incorporation is permitted and to the extent such disclosure is consistent with the description of the present disclosure.

While the present disclosure has been described with respect to a number of embodiments and examples, those skilled in the art, having benefit of the present disclosure, will appreciate that other embodiments can be devised which do not depart from the scope and spirit of the present disclosure as described herein.

We claim:

1. A thermoplastic vulcanizate composition comprising:
a thermoplastic polyolefin; and
an ethylene based copolymer rubber, wherein the ethylene based copolymer rubber has:

a Mw of from 500,000 g/mol to 3,000,000 g/mol,
a Mw/Mn of 4.0 or lower,
a $g'_{vis}$ of 0.90 or greater, and
a $\Delta\delta$ of from 30 to 80 degrees from small amplitude oscillatory shear (SAOS) where $\Delta\delta=\delta$ (0.1 rad/s)–$\delta$ (128 rad/s), or a large amplitude oscillatory shear (LAOS) branching index of less than 3.

2. The thermoplastic vulcanizate composition of claim 1, wherein the ethylene-based copolymer rubber is an ethylene-propylene-diene terpolymer comprising an ethylene content of 70 wt % or lower based on a total weight of the terpolymer.

3. The thermoplastic vulcanizate composition of claim 1, wherein the ethylene-based copolymer rubber is an ethylene-propylene-diene terpolymer, and wherein the ethylene-propylene-diene terpolymer is produced by a slurry polymerization process using a Zeigler-Natta catalyst or a metallocene catalyst.

4. The thermoplastic vulcanizate composition of claim 1, wherein the ethylene based copolymer rubber is an ethylene-propylene-diene terpolymer, and wherein the ethylene-propylene-diene terpolymer is produced by a solution polymerization process using a Zeigler-Natta catalyst or a metallocene catalyst.

5. The thermoplastic vulcanizate composition of claim 1, further comprising an oil.

6. The thermoplastic vulcanizate composition of claim 5, wherein the oil is a mineral oil, a synthetic oil, or a combination thereof.

7. The thermoplastic vulcanizate composition of claim 6, wherein the mineral oil is an aromatic oil, a naphthenic oil, a paraffinic oil, an isoparaffinic oil, a synthetic oil or a combination thereof.

8. The thermoplastic vulcanizate composition of claim 1, further comprising a compatibilizer, a filler, or a nucleating agent.

9. The thermoplastic vulcanizate composition of claim 1, further comprising calcium carbonate, clay, silica, talc, titanium dioxide, carbon black, mica, wood flour, a nucleating agent or a combination thereof.

10. The thermoplastic vulcanizate composition of claim 1, further comprising a curative system, wherein the curative system comprises a curative.

11. The thermoplastic vulcanizate composition of claim 10, wherein the curative comprises a phenolic resin, a peroxide, a maleimide, a silicon-based curative, a silane-based curative system, sulfur-based cure system, or a combination thereof.

12. The thermoplastic vulcanizate composition of claim 10, wherein the curative is a hydrosilylation curative.

13. The thermoplastic vulcanizate composition of claim 10, wherein the curative is a phenolic resin.

14. The thermoplastic vulcanizate composition of claim 1, wherein the ethylene based copolymer rubber has a Mw of from 600,000 g/mol to 1,000,000 g/mol.

15. The thermoplastic vulcanizate composition of claim 1, wherein the ethylene based copolymer rubber has a Mw/Mn of 3.0 or lower.

16. The thermoplastic vulcanizate composition of claim 15, wherein the ethylene based copolymer rubber has a Mw/Mn of 2.5 or lower.

17. The thermoplastic vulcanizate composition of claim 1, wherein the ethylene based copolymer rubber has a $g'_{vis}$ of 0.95 or greater.

18. The thermoplastic vulcanizate composition of claim 1, wherein the ethylene based copolymer rubber has an ethylene content of from 50 wt % to 70 wt % based on a total weight of the ethylene based copolymer rubber.

19. The thermoplastic vulcanizate composition of claim 1, wherein the ethylene based copolymer rubber terpolymer has an ethylene content of from 55 wt % to 65 wt % based on a total weight of the ethylene based copolymer rubber terpolymer.

20. The thermoplastic vulcanizate composition of claim 1, wherein the ethylene based copolymer rubber has a dry Mooney Viscosity ($ML_{1+4}$ at 125° C.) of 250 MU or greater.

21. A thermoplastic vulcanizate composition comprising:
a thermoplastic polyolefin; and
an ethylene based copolymer rubber, wherein the ethylene based copolymer rubber has:
a Mw of from 500,000 g/mol to 3,000,000 g/mol,
a Mw/Mn of 4.0 or lower, and
a $g'_{vis}$ of 0.90 or greater,
wherein the thermoplastic olefin is a polypropylene and the ethylene based copolymer rubber is an ethylene-propylene-diene terpolymer.

22. The thermoplastic vulcanizate composition of claim 21, wherein the diene of the ethylene-propylene-diene terpolymer is 5-ethylidene-2-norbornene (ENB), 5-vinyl-2-norbornene (VNB), or a combination thereof.

23. The thermoplastic vulcanizate composition of claim 21, wherein the diene content of the ethylene-propylene-diene terpolymer is from 3 wt % to 15 wt % based on the total weight of the ethylene-propylene-diene terpolymer.

24. The thermoplastic vulcanizate composition of claim 21, wherein the diene content of the ethylene-propylene-diene terpolymer is from 4 wt % to 12 wt % based on the total weight of the ethylene-propylene-diene terpolymer.

25. The thermoplastic vulcanizate composition of claim 21, wherein the diene content of the ethylene-propylene-diene terpolymer is from 4 wt % to 9 wt % based on the total weight of the ethylene-propylene-diene terpolymer.

* * * * *